United States Patent
De Ridder

(10) Patent No.: US 8,712,594 B2
(45) Date of Patent: Apr. 29, 2014

(54) OPTIMIZED CONTROL OF AN ENERGY SUPPLYING SYSTEM AND AN ENERGY CONSUMING SYSTEM

(75) Inventor: Fedor De Ridder, Ukkel (BE)

(73) Assignee: Vito NV, Mol (BE)

( * ) Notice: Subject to any disclaimer, the term of this patent is extended or adjusted under 35 U.S.C. 154(b) by 46 days.

(21) Appl. No.: 13/416,578

(22) Filed: Mar. 9, 2012

(65) Prior Publication Data

US 2012/0259471 A1    Oct. 11, 2012

Related U.S. Application Data

(63) Continuation-in-part of application No. PCT/EP2010/063012, filed on Sep. 6, 2010.

(30) Foreign Application Priority Data

Sep. 10, 2009    (EP) .................................... 09169930

(51) Int. Cl.
    *G05D 7/00*    (2006.01)
(52) U.S. Cl.
    USPC .......................................... 700/287; 700/282
(58) Field of Classification Search
    None
    See application file for complete search history.

(56) References Cited

U.S. PATENT DOCUMENTS

| 2008/0261093 A1* | 10/2008 | Kelly et al. ..................... 429/26 |
| 2009/0287355 A1* | 11/2009 | Milder et al. .................. 700/277 |
| 2011/0166718 A1* | 7/2011 | Van Bael et al. ............... 700/287 |

FOREIGN PATENT DOCUMENTS

GB    2440281 A *  1/2008  ............. F24D 10/00

OTHER PUBLICATIONS

Examination Report of EPO regarding EP 09 169 930.6-2321, Mar. 14, 2012.

\* cited by examiner

*Primary Examiner* — Ryan Jarrett
(74) *Attorney, Agent, or Firm* — Bacon & Thomas, PLLC

(57) ABSTRACT

The present invention relates to a fuel control system for a local energy supplying and/or an energy consuming system. The local energy system comprises at least a first controllable electrical unit outputting electrical power and generating a first heat flux within a series of time periods, a controllable fuel powered heating unit for outputting a further heat flux within the series of time periods, a controllable heat buffer for storing the heat fluxes and outputting a fourth heat flux within the series of time periods and a heat flux user thermally coupled to the heat buffer.

7 Claims, 17 Drawing Sheets

OPTIMIZED CONTROL OF AN ENERGY SUPPLYING SYSTEM AND AN ENERGY CONSUMING SYSTEM

This is a Continuation-in-Part of international application no. PCT/EP2010/063012 filed Sep. 6, 2010, claiming benefit of priority of European application no. 09169930 filed Sep. 10, 2009.

The present invention relates to systems and method for control of an energy supplying system or an energy consuming system, in particular of a such a system having a buffer in which energy can be stored so that energy can be supplied to the network or energy taken from the network. The invention is particularly, but not exclusively, applicable to energy generating systems in which a CHP (Combined Heat and Power) installation is involved which can simultaneously supply heat and electrical power.

STATE OF THE ART

Technical solutions have been proposed in order to overcome the drawbacks of increasing energy prices and the environmental consequences of energy generation and energy conversion. One solution, which is applied more and more, is the use of CHP (Combined Heat and Power) installations which make it possible to recuperate energy losses—the heat lost during the production of electricity—as a useful source of heat. A typical example of the application of CHP's can be found in the horticultural industry with greenhouses for the production of vegetables, plants, flowers, etc. In such applications, the "waste" heat is used for heating the greenhouses while the generated electricity is sold to the electrical market.

However, the time heat is needed is not coinciding with the time electricity can be sold and the situation could happen that the owner has a big need for heating the greenhouses at a moment where the need for electrical power is very low and the price, the owner can get for the electricity is also very low, e.g. over night. As a consequence, the efficiency of the whole installation could be dropping and could even be negative. One way of meeting this possible lack in efficiency of the installation is to provide a buffer in which heat energy can be stored so that the CHP can be run at moments of high electricity need but the "lost" heat energy can be used at moments of low electricity need.

In order to get a reasonable safety, a classic heating unit is always foreseen in such installations. Indeed, it cannot be excluded that at certain moments, when there is there no possibility to deliver electrical power to the market, there exists a demand for heat while the buffer is nearly empty. To cope with such situations, a conventional heating unit (CHU) is provided. Managing such a rather complex installation—a CHP unit, a buffer, a CHU unit and a user of heat power, the installation being further connected with the electrical power network—is not easy and at regular moments a decision is to be taken which unit should be working and with which capacity so that the buffer is not overfilled and not empty either while at the same time the demand of heat must be satisfied. To make things worse, it often happens during cold winter days that a full buffer is consumed during one night. The glasshouse will only remain warm if such situations are foreseen, so that the buffer is full at dawn and both installations are ready to supply additional heat.

The system is even more complicated by the fluctuating prices on the electricity market. An electrical energy producer wanting to sell the power he is generating is confronted with a fluctuating demand of electricity and with market prices, which by consequence are also fluctuating over time. Special auction processes are organized to bring together buyers and sellers. Due to these fluctuations, the overall efficiency gain of the installation may be decreased by the lower results at the selling market.

Different solutions have been proposed for solving the problems of producers having a plurality of pure electricity generation units and operating on one or more markets.

The article by Javad Sadeh e.a.: "A risk-based approach for bidding strategy in an electricity pay-as-bid auction" in "European Transactions on electrical power", 2009, pages 39-55, describes an optimization process to be used by a Generation Company having multiple production units and operating on a single market. The optimization process uses a probability density function (pdf) for estimating the price at each hour.

The article by Chefi Treki e.a.: "Optimal capacity allocation in multi-auction electricity markets under uncertainty" in "Computers & Operations Research", Vol. 32, 2005, pages 201-217 describes a method, to be used by a seller having a plurality of production units and operating on different markets. The method solves the problem of deciding which production unit to commit for a given time period and which quantity of electrical energy to offer on the different markets.

The article by H. Lund e.a. "Management of fluctuations in wind power and CHP comparing two possible Danish strategies" in "Energy", 2002, volume 27. no 5, pages 471-483 describes the problems linked with the integration of CHP and wind energy. According to this article, a solution could be found by investments in heat storages and proposes to add heat pumps to the CHP units.

In none of these articles the problem of optimization of a CHP installation, comprising a CHP unit and delivering energy to a local customer and electricity to different markets is discussed.

In the case of the greenhouses, which is given here as an example, the problem of optimization is even more complicated by the fact that in most of these installations, a classic heating unit is also provided in order to further stabilize the whole system against fluctuations of the need of thermal energy, fluctuations of the market prices, etc.

In such a case, reaching an optimized efficiency is difficult to achieve because the installation is delivering two different kinds of energy: heat and electricity and two separate generators are used: one producing only thermal energy and another producing thermal energy and electrical energy. The heat demand develops independently from the demand of electrical energy. The heat demand and the demand for electrical energy are also fluctuating over the day and over the year. Certain installations need more heat over night than during the day, because night temperatures are normally lower than temperatures over day while electricity consumption is normally dropping during the night. This difficulty is also complicated by the existence of different markets for electrical energy: producers of electricity deliver normally electrical energy on the basis of contracts of quite different duration: there are contracts covering months, other cover a day and even a single hour.

Another example can be found in cooling installations. Considering a certain amount of "overcooling" as a buffer (say that normally a cooling is foreseen up to −20° C., when cooling to −25° C. there is a buffer between −20° C. and −25° C.). In this example, it may be more efficient to overcool up to −25° C. when electricity prices are low and use the "stored cooling capacity" for times when electricity is expensive. Of course, the cooling devices will work less efficient if cooling to −25° C. has to be reached. So again, careful considerations have to be taken to decide when this strategy is used.

In all the given examples, it is important for the producers and the consumers to run the production or consumption facilities with optimized efficiency in order to maximize their profits or to minimize their losses.

SUMMARY OF THE INVENTION

It is an object of the present invention to provide a fuel control system for a local energy supplying and/or energy consuming system, in particular such a system having a buffer for storing energy, so that the demand for energy by the consuming system is always satisfied while the level of stored energy in the buffer remains between a given maximum and a given minimum.

It is further an object of this invention to provide an optimized control of an energy supplying system or an energy consuming system, in particular of a such a system having a buffer in which energy can be stored so that energy can be supplied to the network or energy taken from the network in a way that the system is operating in an optimized way.

This object is achieved by a fuel control system for a local energy supplying and/or an energy consuming system, wherein the local energy system comprises a first controllable electrical unit outputting electrical power and generating a first heat flux within a series of time periods and/or a second controllable electrical unit receiving electrical power and absorbing a second heat flux within the series of time periods, both first and second electrical networks being connected to an electrical network. The electrical power received or generated within any time period is at least partially stochastically variable within a first probability distribution function and the demand for electrical power being controlled by a hybrid open loop/closed loop regulatory mechanism, there being some electrical energy received or output within any time period. The local energy system further comprises a controllable fuel powered heating unit for outputting a third heat flux within the series of time periods and a controllable heat buffer for storing any or all of the first to third heat fluxes and outputting a fourth heat flux within the series of time periods. The fuel powered heating unit is coupled to the heat buffer. The local energy system further comprises a heat flux user thermally coupled to the heat buffer. The demand for heat power by the heat flux user within the series of time periods is stochastically variable within a second probability distribution.

A controller is coupled to the first and/or second electrical unit, the fuel powered heating unit and the heat flux user for exchanging control variables therewith and for controlling fuel supply to the fuel powered heating unit so that a) the demand for heat power by the heat flux user is satisfied in any of the time periods and b) the heat buffer is not overfull or empty in any of the time periods.

Thus a control variable can be a state space variable which can be addressed to guide a system to its optimal behavior. According to the present invention, the first controllable electrical unit may be a CHP-unit, and each time period may be divided into successive sub-periods. The local energy system and in particular the hybrid open loop/closed loop regulatory mechanism may further comprise means for determining for each sub-period on a historical basis a statistical price of the electrical energy in at least one market served by the electrical network, means for determining for each sub-period on a historical basis a statistical value of the demand of heat flux by the user and means for deriving, for each sub-period, from said statistical price and said statistical value the quantity of fuel needed by the CHP-unit so that the working of the local energy supplying and/or energy consuming system is optimized.

According to the present invention, the local energy system may further comprise means for deriving, for each sub-period, from said statistical price and said statistical value the quantity of fuel needed by the heating unit or a cooling unit so that the working of the local energy supplying and/or energy consuming system is optimized.

According to the present invention, the determining the statistical price may be done by on the basis of a temporal probability density function.

According to the present invention, the determining the statistical value of the heat demand may be done by on the basis of a temporal probability density function.

According to the invention, the electrical network may be serving at least two different markets in which electrical energy is handled at different prices, and the means for determining the statistical price, may determine the price on each of these markets. According to the present invention, the deriving of the quantity of fuel needed by the CHP-unit and the quantity of fuel needed by the heating unit may be performed at two levels: a first level deriving the fuel needed by the CHP-unit for covering the electricity production, demanded by the one of the markets and a second level deriving the fuel needed by the CHP-unit for covering the electricity production, demanded by the other of the two markets and deriving the fuel needed by the heating unit.

It is also an object of the present invention to provide a computer program product comprising program code means stored on a computer readable medium and adapted for performing the deriving the quantity of fuel needed by the CHP-unit and the quantity of fuel needed by the heating unit or the cooling unit as described above, when said program is run on a computer.

It is a further object of the present invention to provide a local energy supplying and/or an energy consuming system which comprises a first controllable electrical unit outputting electrical power and generating a first heat flux within a series of time periods and/or a second controllable electrical unit receiving electrical power and absorbing a second heat flux within the series of time periods, both first and second electrical networks being connected to an electrical network. The electrical power received or generated within any time period is at least partially stochastically variable within a first probability distribution function and the demand for electrical power is controlled by a hybrid open loop/closed loop regulatory mechanism. Some electrical energy is received or output within any time period. The local energy supplying and/or an energy consuming system comprises further a controllable fuel powered heating unit for outputting a third heat flux within the series of time periods, a controllable heat buffer for storing any or all of the first to third heat fluxes and outputting a fourth heat flux within the series of time periods. The fuel powered heating unit is coupled to the heat buffer. The local energy supplying and/or an energy consuming system comprises also a heat flux user thermally coupled to the heat buffer, the demand for heat power by the heat flux user within the series of time periods being stochastically variable within a second probability distribution. The local energy supplying and/or an energy consuming system comprises further a fuel control system as described above.

It is a still further object of the present invention to provide a method for optimizing control of a CHP installation. The installation comprises a CHP-unit and a buffer and the installation is delivering energy to a consumer and electrical energy to an electrical network. The method is adapted to control the CHP installation over a given period of time, the given period of time being divided into successive sub-periods. The method comprises the steps of determining for each sub-period on a historical basis a statistical price of the electrical energy in at least one market served by the electrical network, determining for each sub-period on a historical basis a statistical value of the demand of energy by the consumer and deriving, for each sub-period, from said statistical price and said statistical value the quantity of fuel needed by the CHP-unit.

According to the present invention, the installation may deliver heating energy to a consumer and the installation may further comprise a conventional heating unit. The method may further comprise the step of deriving, for each sub-period, from said statistical price and said statistical value the quantity of fuel needed by the conventional heating apparatus.

According to the present invention, the determining the statistical price may be done by on the basis of a temporal probability density function.

According to the present invention, the determining the statistical value of the heat demand may be done by on the basis of a temporal probability density function. In some embodiments, a Chapman-Kolmogorov equation can be introduced to calculate the probability density functions in a state space. State space variables are deterministic variables, which can be used in a mathematical model to determine for instance future states of a system. An example of such a state space variable can be a State-of-Charge (SoC) of a buffer.

According to the present invention, the electrical network may be serving different markets in which electrical energy is handled at different prices (during the same sub-period), and the method may comprise the step of determining of a statistical price on each of these markets. According to the present invention, the deriving of the quantity of fuel needed by the CHP-unit and the quantity of fuel needed by the conventional heating apparatus may be performed at two levels: a first level deriving the fuel needed by the CHP-unit for covering the electricity production, demanded by the day ahead market and a second level deriving the fuel needed by the CHP-unit for covering the electricity production, demanded by the continuous intraday market (CIM).

DETAILED DESCRIPTION OF THE EMBODIMENTS

The present invention will be described in detail with respect to some particular embodiments and with reference to certain drawings but the invention is not limited thereto but only by the claims. The drawings described are only schematic and are non-limiting.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

In the present application, by "optimizing the working of a system" is meant the control of the system so that efficiency is optimized and that profits are maximized or costs minimized.

The terms "control over a period of time" and "sub-periods" are also used in the description and claims. By "period of time" or "time period" is meant a certain period, starting at a given time e.g. 0 hrs and ending at another time e.g. 24 hrs later. In the example given the period of time covers thus a normal day. The period of time can be subdivided in a number of sub-periods: e.g. the period of time may comprise 24 successive sub-periods of one hour. Variables used in the control method, of the present invention, may vary within the period of time and may remain stable during each sub-period. Still according to the example given below, the 24 hrs period of time is subdivided in 24 successive sub-periods, each sub-period having a duration of one hour.

By "buffer" is meant in the present description and in the appending claims a device wherein a certain amount of energy can be stored. This may be a separate device e.g. a boiler wherein thermal energy is stored but it can also be a consuming device itself e.g. a building can represent an energy storing buffer when it is allowed to heat that building in excess of the normal temperature by a certain amount of degrees.

Figure 1:
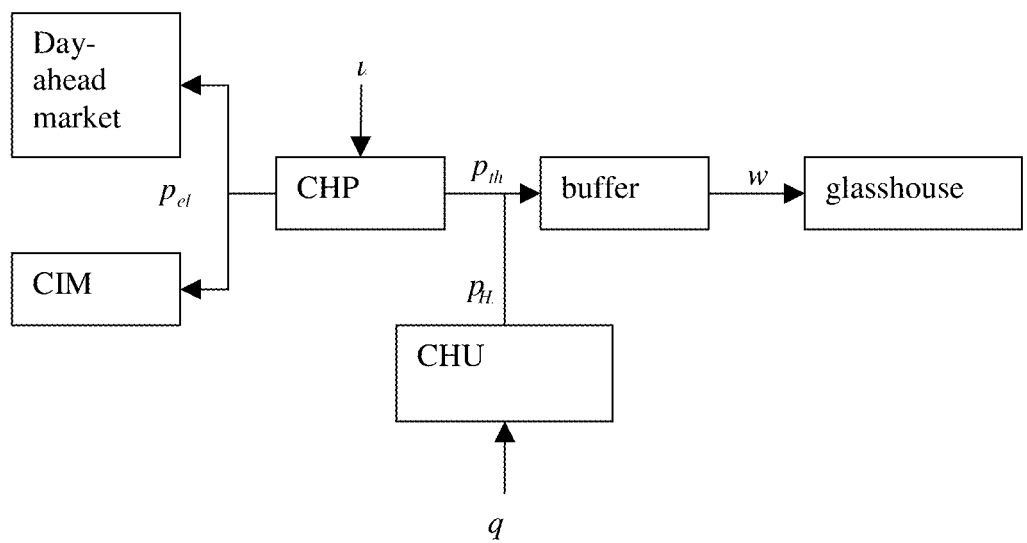
FIG. 1 illustrates a typical CPH installation, used for greenhouse heating.

The invention will be explained in more detail on the basis of a CHP installation used for the heating of greenhouses and selling electrical energy on a double market. As illustrated in FIG. 1, the complete installation comprises a CHP unit (1), a conventional heating unit (2), a buffer (3) and one or more greenhouses (4). In the example, the CHP uses gas as fuel, but other kinds of fuel are also possible like solid or liquid fuel, waste material or garbage e.g. wood, straw, etc. The electrical energy ($p_{el}$), generated by the CHP is proportional to the quantity of fuel, fed to the CHP (q). The heat energy ($p_{th}$), delivered by the CHP, is also proportional to the quantity of fuel, fed to the CHP (a).

The heat ($p_H$)) delivered by the conventional heating installation is proportional to the quantity of fuel feeding it (q).

The heat, produced by the CHP unit and by the conventional heating unit is stored in buffer (3); the amount of heat stored in the buffer at the beginning of a certain sub-period k is represented by $x_k$. The amount of heat, needed by the greenhouses during a certain sub-period k is represented by $w_k$.

In the example, the installation is delivering electrical energy to two sub-markets: the Day ahead market and the CIM-market or the Continuous Intraday Market. Such markets are modeled as a hybrid open loop/closed loop regulatory mechanism.

Normally, the electricity market may include different sub-markets, e.g.:
- a market based on long-term contracts, where electrical energy may be sold months ahead;
- the day ahead market where the electrical energy is traded one day before delivery;
- the continuous-intraday-market (CIM) where electrical energy may be traded the day itself until 10 minutes before delivery.

There exist also other sub-markets for the delivery of electrical energy (e.g. the adjustment market, the balancing market, etc). Each market has its own price and trading rules, valid for a certain sub-period. In the given example, only two sub-markets are involved: the day ahead and the CIM market, although the principles of the invention may also be applied to other submarkets.

The invention can also be used to control energy fluxes if no markets are (temporarily) available or if only one market is used.

In the case of a CHP, a long-term contract market is not always the most interesting choice; indeed, in this market prices are always lower although they guarantee a certain security.

Figure 5:
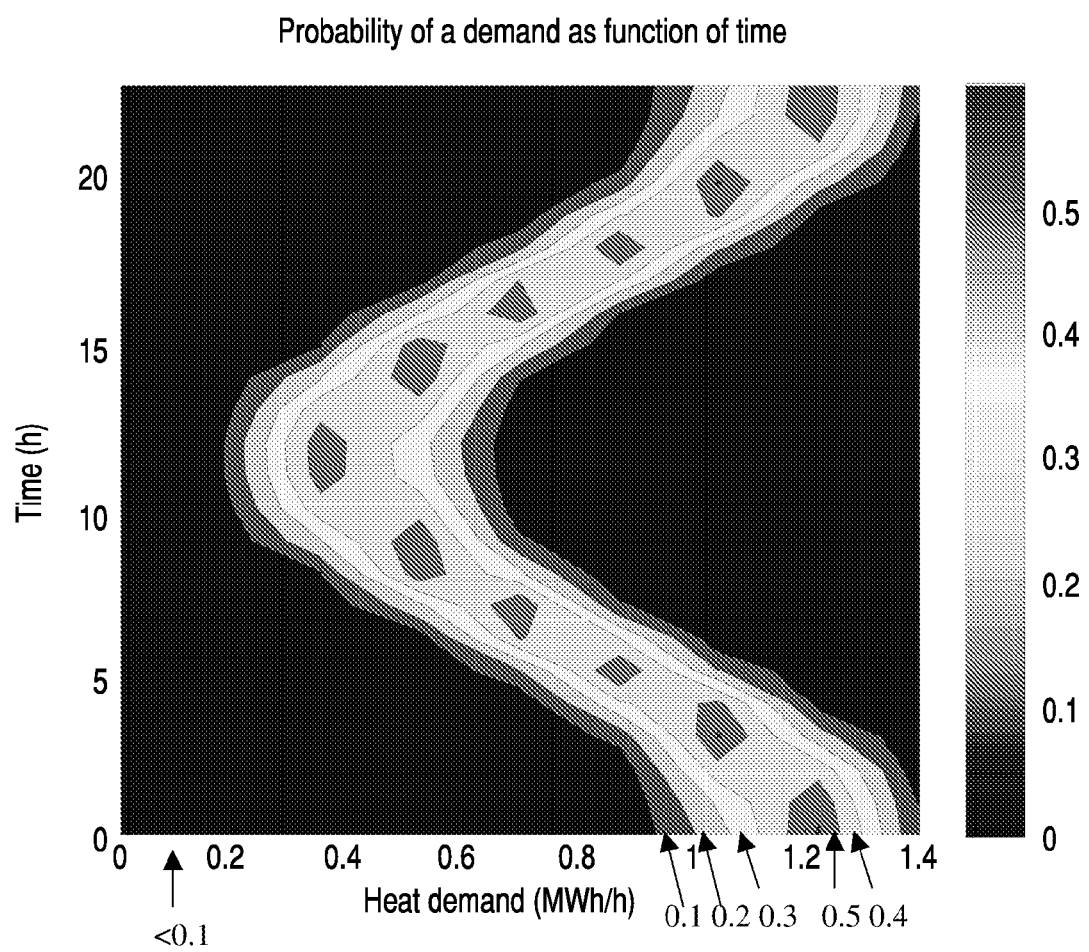
FIG. 5 gives development of the heat demand over 24 hours.
Figure 6:
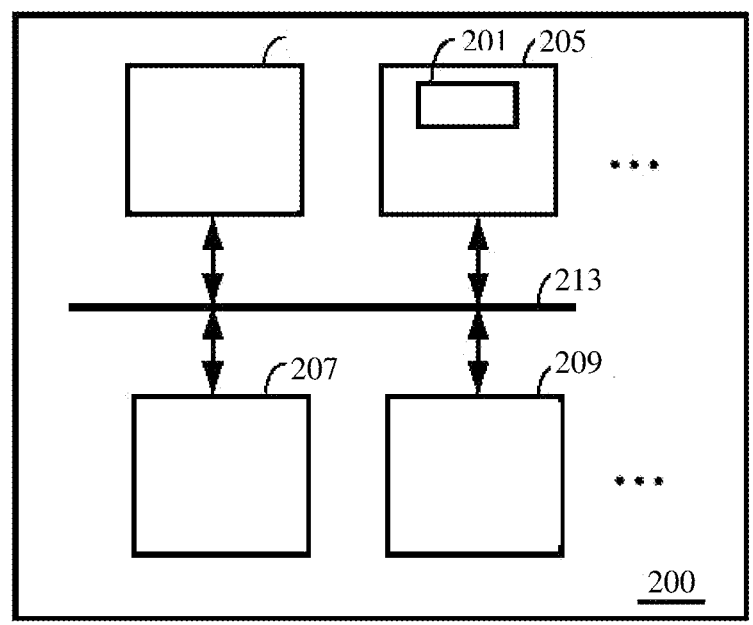
FIG. 6 shows a computing system schematically such as for use with the present invention.

On the short time however, there exist generally rather precise forecasts regarding temperature, speed and direction of wind, etc. so that the need of heat can be predicted with a relative precision. Even the evolution of need of heat over a 24 hour period of a day is very well predictable, taking into account historical data. FIG. 5 shows the statistical evolution of the demand of heat by a greenhouse for a particular day (24 hrs) of the year.

Figure 2:
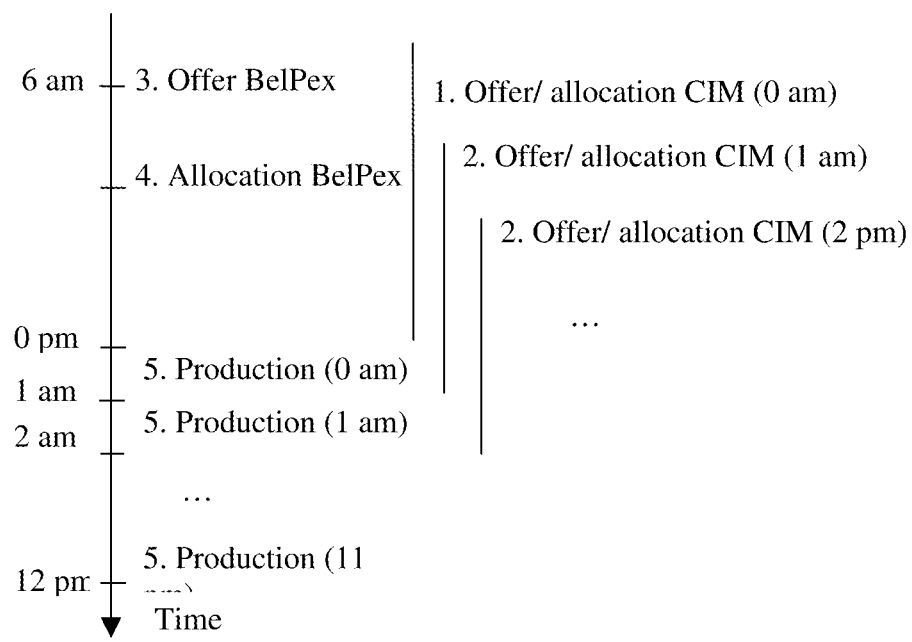
FIG. 2 illustrates the timeline of Day ahead bidding and the timeline of CIM-bidding.
Figure 3:
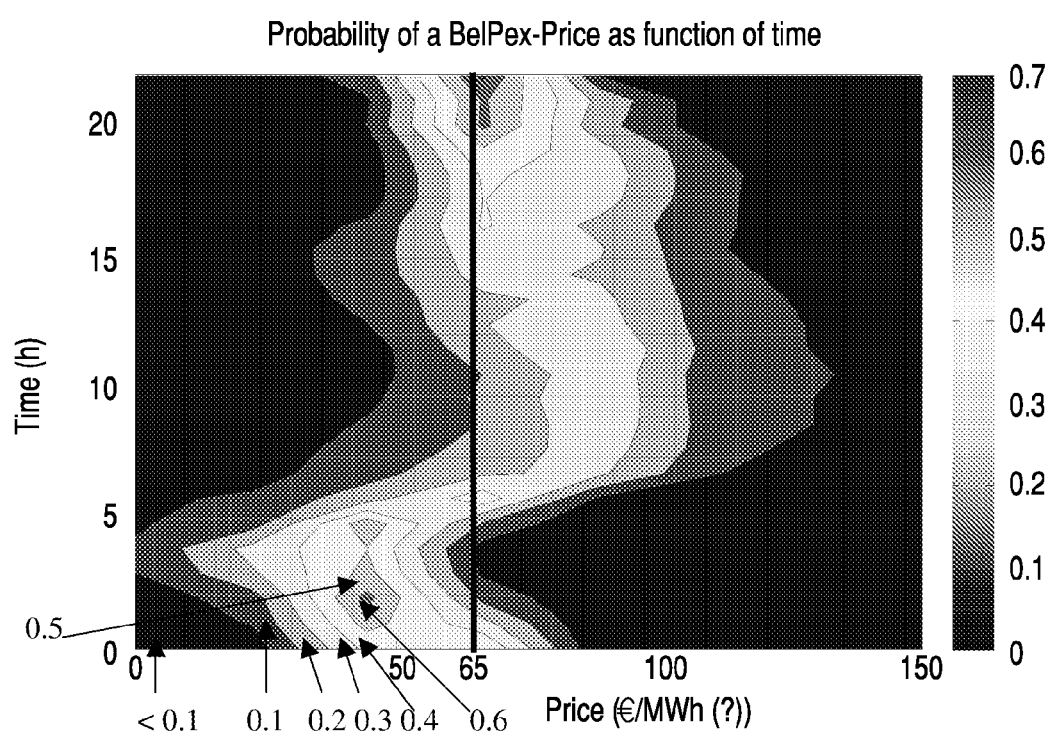
FIG. 3 gives the probability of getting on the Day ahead market a given price as function of time.

A typical example of the selling process of electrical power on the two markets of the example, the day ahead market and the CIM-market, is illustrated in FIG. 2. On the day ahead market, electrical energy can be offered until 6 a.m. of the day before (D-1) and the electricity is to be delivered on day D. The offer is limited to a particular hour (sub-period) of day D, i.e. there is an offer of a certain quantity of electrical energy, to be delivered during a certain hour at a certain price. For a popular day-ahead market in Belgium, i.e. the Belpex market, these biddings must be received by the market before 6 am of D-1. In Belgium for instance 14% of all power is traded on this day-ahead market. Traders who want to sell or buy power on this market do this by sending bidding functions to this market. A bidding function presents the amount of power [kW] to be traded as function of the price [€/MWh]. Evidently, a trader who is selling power will send an increasing function, while someone interested in buying power, will send a decreasing function. For every hour such a bidding function can be sent, so that different amounts can be traded during the day. On the other hand, since the day-ahead market prices are unknown at the time of bidding, block bids can protect against unexpected price changes over time and have their relevance. In the present application, block bids are preferably not taken into account. The market matches demand and supply by calculating an equilibrium price and provides allocations to all players at 11 a.m. of day D-1. This market is modeled as an open loop regulatory mechanism as the amount of energy to be delivered is set in advance. In addition, in reality, an additional check can be performed to see if the power grid is able to transport the power during the next day and possibly measures can be taken if this would not be the case, this geographical aspect of the power matching is preferably not taken into account in the present application. A PDF thus can be constructed similar to a PDF of for instance heat demand: to construct a PDF for a given hour of a given day, data from the same hour of all days ranging from one week before to one week after the particular day are gathered and a histogram of these data is preferably used. Notice that several features remain present in these PDF's (as illustrated in FIG. 3 for instance): prices are higher during the day than during the night. The variability is smallest at 6 am and highest at around 10 a.m. During winter months this structure is different with e.g. peaks in the evening due to lighting. The amount of power which can be sold on a day-ahead market can be largely determined by the initial state of charge of the buffer capacity. If the buffer is completely filled, it becomes much harder to guess when to bid on the day-ahead market. This situation is different for an empty buffer. Here the controller is free to bid at every time slot. If some bids appear to be unsuccessful, the conventional installation can still provide the necessary heat. Thus if the buffer is empty, the controller is active all day round and bids starting its marginal cost. If the buffer is full, only around noon the controller is bidding its full power. This is logical, since prices are highest in this period. During the evening it is still bidding, but no longer at its full power. As a result, profits can vanish if the buffer becomes too full.

However, if power is sold on a day-ahead market and cannot be delivered, a penalty has to be paid. Currently, this penalty consists of 100% of the allocation price plus an 8% imbalance charge. This 8% imbalance charge will have some influence on the bidding strategy of the controller. If this charge would be larger, this can result in more cautious bids and vice versa. Since the controller is speculating on the day-ahead market, there is always a probability that the power sold cannot be delivered. If this probability decreases, the expected profit will become negative at a certain moment. If the probability that no power can be delivered, e.g. because the buffer is completely filled, is larger than a certain value, the controller may expect that the penalty is larger than the expected profits and it is wiser not to sell energy. In the current situation, with a penalty of 8%, the "breakeven"-probability is only 52%. So if it is slightly more likely that the buffer is not completely filled at a certain time in the future than that it is, it is better to make the bid. Even if the penalty increases up to 200%, the "breakeven"-probability is 75%. Advantageously, the present invention takes these probabilities implicitly into account and can guide the system in such a way that penalties are avoided without losing too much profit.

On the continuous intraday market (CIM) in Belgium an offer for delivery of electricity during a particular hour can go out from 24 hours before the hour until 10 minutes before that particular hour. Here power is traded if a "match" is found. The continuous intraday market is a smaller market than the Belpex and is meant to trade unexpected or unpredicted power excesses and shortages. This can again be done in time slots of one hour and a trader can put his demand or excess power on this market starting 24 h in advance until 10 minutes before the respective time slot. If a trader wants to sell power, he/she can put the amount of power [kW] on the market at a given price [€/MWh]. If a buyer is interested, he or she can buy this package. Possibly, no interested buyer shows up and the power is not traded at all. Actually this market can be described by two stochastic parameters: the price at which power can be traded and the probability that an interested party shows up. Preferably, these two variables can be combined. If no interested party shows up, the price is simple zero. So compared to a day-ahead market, a CIM offers a larger flexibility. This can advantageously be used to tune the system instantaneously in the desired directions. The price for this flexibility is lower expected profits. In reality the CIM and day-ahead prices are correlated: if one is high, one may expected that the other would be higher as well. Such correlations are not taken into account. This correlation effect can slightly bias the results: the additional profits, which can be made by bidding on two markets, can be slightly lower in reality.

Regarding the electricity production on day D, the selling process is developing as follows:
- from 0 a.m of D-1, an offer can be made on the CIM-market for electricity to be delivered on 0 a.m. of day D; such an offer can be accepted which has consequences for future offers and prices relating to day D;
- each following hour of D-1, a new CIM-offer can go out for day D and this can include energy and prices for the next hour of day D;
- until 6 a.m. of D-1, a day ahead offer can be issued for each hour of day D; at this hour the day-ahead market closes;
- on 11 a.m. of D-1, the day ahead market closes;
- from 0 a.m. of day D, the quantities of electrical energy, agreed on the day-ahead market and on the CIM-market, are to be delivered.

The CIM market is modeled as a closed loop regulatory mechanism as the demand is updated at regular times and these feedback from the market in real time.

On the day-ahead market, the biddings have to be produced before the controller is operating the actual day. So this is actually an open-loop problem, since no feedback is possible during the operation. On the CIM, bidding strategies can be adapted during the operation. This type off control is called closed-loop. Chronologically, the bids on the day-ahead market are preferably made first, but these bids can depend on the tuning freedom left on the CIM. Accordingly, the combination of a first market like the CIM market and a second market like the day ahead market is modeled as a hybrid open loop/closed loop regulatory mechanism.

FIG. 3 shows an example of the 24 hours evolution of the probability to get a certain price on the day-ahead market. As can be expected, the lowest prices are situated around 4 a.m. and the highest prices around 10 a.m. Typically, the spread (which corresponds to the uncertainty) is higher over day than during night. The black vertical line represents the points of break-even: there is no gain of loss by the system.

Figure 4:
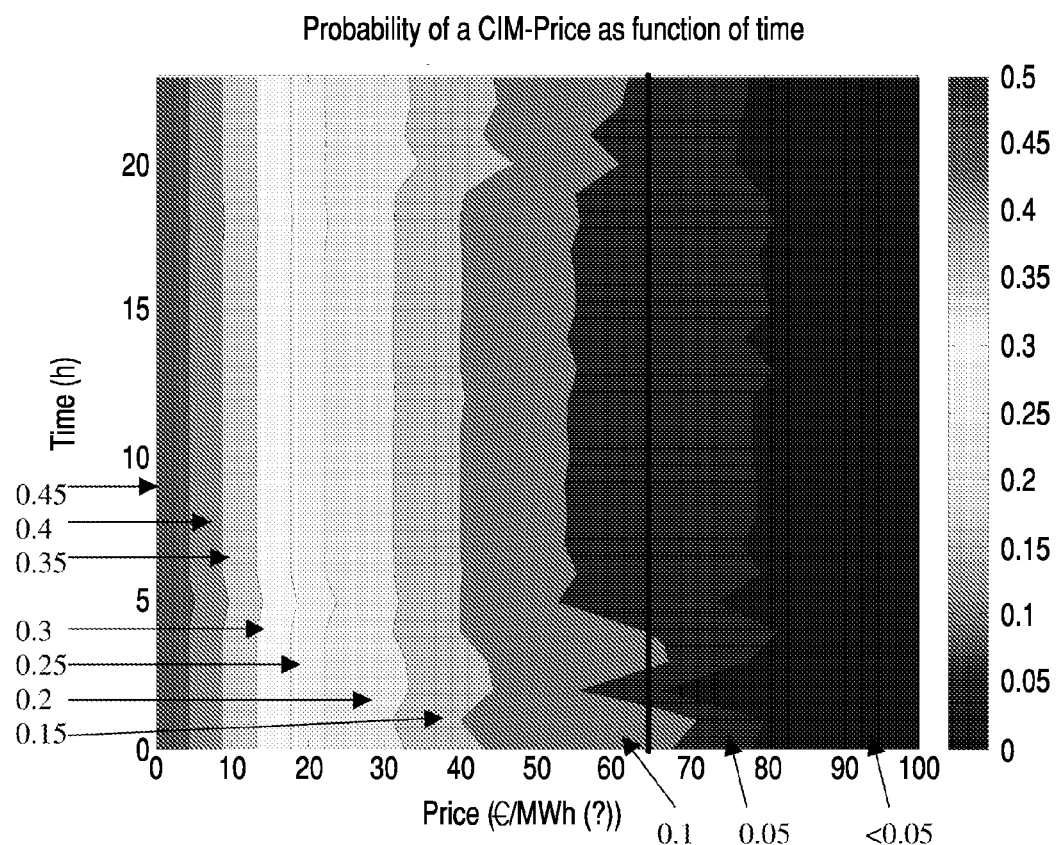
FIG. 4 gives the probability of getting on the CIM-market a given price as function of time.

FIG. 4 shows an example of the 24 hours evolution of the probability to get a certain price on the CIM-market. In the shown example, there is a big chance that there are no buyers, which explains the high probability to get a price of 0 €/MWh. The black vertical line represents again the points of break-even: there is no gain of loss by the system.

FIG. 5 illustrates a typical evolution over 24 hours of the probable heat demand. In this example, there is a high demand over night. The spread however is relatively stable.

From the above, it can be deduced that the quantity of electrical energy, to be generated by the CHP, can change every hour and that price, paid for the generated electrical energy, can also change every hour. This is valid on both markets: the day ahead market and the CIM-market. As stated above, in the example, the period of time is 24 hours (staring at 0 hrs) and this period of time is subdivided in 24 sub-periods. Any optimization has to take this into account: when optimizing over a 24 hr day (the period of time), this must be done in discrete steps, one step per hour.

An algorithm has been developed to optimize the control of the installation by determining the quantity of fuel needed to feed the installation when profit is to be maximized. The novelty of this algorithm is that it can guarantee to find an optimal solution, i.e. no better solution exist, and that it is able to combine markets, which act on different time scales, like day-ahead market (days) and CIM (hours). The control of the local energy supplying and/or an energy consuming system, taking into account the day ahead market conditions, can be considered an open loop regulatory mechanism with no feedback of the real situation of the system, contrary to the control of the local energy supplying and/or an energy consuming system, taking into account the CIM-conditions which is a closed loop regulatory mechanism in which the real time variables of the system are also taken into account.

An optimized control of the installation depends on the following variables:

general variables:
t time; in the calculation the time is represented by subscript "k", indicating the k-th sub-period; k=0, 1, 2, . . . , N.
$x_k$ state-of-charge of buffer at the beginning of the k-th sub-period;

stochastic variables:
$p_k$ day ahead price during the k-th sub-period;
$r_k$ CIM price during the k-th sub-period;
$w_k$ heat demand by greenhouses during the k-th sub-period;

control variables:
$u_k$ quantity of fuel used for generating the electrical energy to the day ahead market during the k-th sub-period;
$v_k$ quantity of fuel used for generating the electrical energy to the CIM market during the k-th sub-period;
$q_k$ quantity of fuel fed to the CHU (classic heating unit) during the k-th sub-period;

According to the invention, optimized control of the installation can be reached by determining for which values of these control variables (i.e. the quantity of fuel necessary to feed the CHP and the quantity for feeding the CHU) profit is maximized. Obviously, such values are dependent on the other variables.

Taking the global system into account, the following problem has to be solved:

$$[u_1, v_1, q_1, \ldots, u_k, v_k, q_k, \ldots u_N, v_N, q_N]^* = \quad (B1)$$

$$\arg\min_{u_1,v_1,q_1,\ldots,u_k,v_k,q_k,\ldots u_N,v_N,q_N}\left(\sum_{k=1}^{N-1} E_{p_k,r_k}\{C_k^s(u_k, v_k, q_k, p_k, r_k)\} + E[C_N(x)]\right)$$

subject to $u_k+q_k+v_k \leq 1.5$ MW, $\quad$ (B2)

$0 \leq x_k \leq 12$ MWh $\quad$ (B3)

$0.37 \leq q_k \leq 1.5$ MW $\vee q_k=0$, $\quad$ (B4)

$0.84 \leq u_k \leq 1.2$ MW $\vee u_k=0$, $\quad$ (B5)

$0.84 \leq v_k \leq 1.2$ MW $\vee v_k=0$, $\quad$ (B6)

$x_1 - x_{initial} = 0$ and $\quad$ (B7)

$P_{k+1}(x) - P_{k+1}(x(x_k,u_k,v_k,q_k,w_k)) = 0$ $\quad$ (B8)

with $u_k = u_k(p_k)$, $\quad$ (B9)

$v_k = v_k(x_k,u_k,p_k,r_k,w_k)$ and $\quad$ (B10)

$q_k = q_k(x_k,u_k,p_k,r_k,w_k)$. $\quad$ (B11)

$x_{k+1}(x_k,u_k,v_k,q_k,w_k) = x_k + \eta_{th}(u_k+v_k) + \eta_{H1}q_k - w_k$ $\quad$ (B12)

$C_k^s(u_k,v_k,q_k,p_k,r_k) = p_{gas}(u_k+v_k+q_k) + M(u_k \neq 0 \vee v_k \neq 0) - \eta_{el}(u_k p_k + v_k r_k)$ $\quad$ (B13)

$C_N(x) = 0$ wherein:

(B1) is the general equation to be optimized. The control variables (u,v,q), can be found at the left-hand side: the quantity of fuel corresponding to the electrical energy delivered at the day ahead market, the quantity of fuel corresponding to the electrical energy delivered to the CIM-market and the quantity of fuel used by the CHU respectively. By the index k is indicated that these three variables can change for each sub-period. The optimum values of these control variables are found by maximizing the right-hand side of the equation, taking into account the constraints given under (B2) to (B8). Symbol E represents the expected value of the function within brackets and arg min represents the algorithm that find those (u,v,q) for which the function (in the present example the sum of two expected values) becomes a minimum.

(B2): indicates that the total energy of the complete installation (CHP and CHU) is limited.

(B3): indicates that the buffer has a minimum and maximum 'state-of-charge'.

(B4): indicates that the energy of the CHU, expressed as a quantity of used fuel, can vary between a minimum of 0.37 MW and a maximum of 1.2 MW. The values of 0.37 MW and 1.2 MW are only given here as an example and they may differ from one installation to another.

(B5-B6): are equations, analogue to equation (B4), but for the CHP.

(B7): says that the initial situation of the system is known.

(B8): is a guarantee of continuity: the probability that the system during sub-period k is evolving into a situation x should be equal to the probability that that the system is in a situation x at the beginning of sub-period k+1.

(B9): the quantity of fuel corresponding to the electrical energy delivered at the day ahead market is only depending on the price on the day ahead market.

(B10-B11): the quantity of fuel corresponding to the electrical energy delivered at the CIM-market and the quantity of fuel used by the CHU are both depending on $(x_k,u_k,v_k,q_k,w_k)$. So depending on the intra-day evolution of the system, the outcome of these variables may change.

Equations (B12-B14) represent specific characteristics of the system. In the case of a CHP is:

(B12): the evolution equation (determining the state of the buffer at the beginning of sub-period (k+1) in function of its state at the beginning of sub-period (k).

(B13): the profit, made during the sub-period k.

(B14): the terminal profit function (a supposition).

All values given in the equations (B2) to (B6) are given as an example and are depending on the actual installation.

Equation (B1) can be minimized using dynamic programming. This method is well-known per se and can be found in the specialized literature, e.g. the original article by Bellman: "Dynamic Programming" or the book: "Dynamic Programming and Optimal Control" by D. P. Bertsekas.

As a result of this minimization, values are found for the control variables (u,v,q) at each sub-period and the corresponding amount of fuel for feeding the CHP-unit and the CHU-unit are determined.

More specifically, in some embodiments where dynamic programming algorithms are used for minimization, a specific outline can be used: first preferably a terminal profit function can be defined. From this equation, optimal control parameters for an operational step can be identified and a profit function can be constructed. This profit function can be used as a terminal profit to identify the controls of a previous step. Typically a set of control parameters can be estimated for every position of the state space and this can be done for instance starting at the end of the control horizon, moving backwards to the beginning Advantageously, using such types of control schemes can result in that all controls can be characterized in advance; so no real time computer power is necessary.

In some embodiment, an assumption can be made, namely that the day over which we want to characterize the optimal control strategy is just one day in a row of identical days. Under these cyclic conditions, a profit function $P_1(x)$ at time $t_1$ can be used as an improved estimate for the terminal profit function $P_N(x)$ for the previous day. After a couple of iterations, this terminal profit function converges. It can be shown that the terminal profit function does converge to the true optimal one; this is also know as the so-called value iteration as disclosed by Bertsekas et al. As a result, in embodiments of the present invention, it is possible to leave the system in such a state that the profits to be made in the next day are not jeopardized, thus if all stochastic parameters would be identical to the current ones. The latter is not necessarily true: power prices, for example, are usually cheaper during the weekends than during week-days. Such effects are thus ignored.

As a result it becomes possible to construct a PDF of the state at every time step. To enable this, we preferably start from a PDF at the first step and assume that this 'current' PDF $f_1(x)$, is known. From this knowledge, the PDF at the next time step $f_{k+1}(x)$, can be calculated. The probability to reach a state is then given by a Chapman-Kolomogrov equation $$f_{k+1}(x_i) = \sum_j f_k(x_j) f_k(x_j \to x_i)$$

with $f_k(x_1)$ the probability to be in state $x_j$ at time $t_k$ and $f_k(x_j \to x_i)$ the probability to make the transition from state $x_j$ to state $x_i$ at time $t_k$. The latter is given by $$f_k(x_j \to x_i) = \sum_m \sum_n f_k(p_m) f_k(w_n) \delta(x_j - x_i)$$

with $f_k(p_m)$ and $f_k(w_n)$ the probabilities for respectively a price $p_m$ and a heat demand $w_k$ at time $t_k$ and $\delta(\ )$ the Dirac distribution. The state $x_i$ can be calculated as follows $$x_i = x_j + \eta_{th}(u^*_k + v^*_k) + \eta_{H1} q^*_k - w_n$$

Herein the control parameters can be evaluated on the discrete grid of the stochastic variables $$u^*_k = u^*_k(p_k)$$

$$v^*_k = v^*_k(x_k, u^*_k(p_k), p_k, r_k, w_k)$$

$$q^*_k = q^*_k(x_k, u^*_k(p_k), p_k, r_k, w_k)$$

With this scheme the PDF of the state can iteratively be calculated from $t_1$ to $t_N$.

In some embodiments, a maintenance cost can be taken into account, as the maintenance cost is a parameter which potentially can have a large impact on the bidding function; because it defines to a large extend the marginal costs of the system (together with the gas price). It is thus advantageous to correctly estimate the maintenance costs. If one would not take maintenance into account, the marginal cost reduces to the ratio of the gas price to the electric efficiency of the CHP. If maintenance costs are taken into account, the marginal cost is the following:

$$MC = \frac{M + p_{gas} u}{\eta_{elec} u}$$

with M the maintenance, $p_{gas}$ the gas price, $\eta_{elec}$ the efficiency of the CHP and u the amount of gas (MW) delivered to the CHP.

For additional explanation regarding the mathematical models used and the algorithm, we refer to Annex I comprising the article title "A trading strategy for industrial CHP's on multiple power markets".

Another example of the present invention can be found in industrial cooling installations. Because in such installations storing of cooling energy in a particular buffer may be problematic, it is proposed to use the cooling unit itself as a buffer by allowing the temperature to vary between two values. E.g., allowing a spread of temperature between −20° C. and −25° C., the buffer reaches its maximum state of charge when the temperature of the cooling unit is −25° C. and its minimum state of charge when the temperature of the cooling unit is −20° C.

In this example the equations become:

$$x_{k+1}(x_k, u_k, v_k, w_k) = x_k - \beta(u_k + v_k)/c + w_k/c \tag{B15}$$

$$C^s_k(u_k, v_k, p_k, r_k) = \eta(u_k p_k + v_k r_k) \tag{B16}$$

$$C_N(X) = 0 \tag{B17}$$

whereby η is the efficiency of the cooling unit and c the heat capacity.

As an example, the constraints could be:

$$-25 \leq x_k \leq -20° C., \tag{B18}$$

$$m_1 \leq u_k \leq M_2 \vee u_k = 0, \tag{B19}$$

$$m_1 \leq v_k \leq M_2 \vee v_k = 0, \tag{B20}$$

$$x_1 - x_{initial} = 0 \text{ and} \tag{B21}$$

$$P_{k+1}(x) - P_{k+1}(x(x_k, u_k, v_k, w_k)) = 0 \tag{B22}$$

whereby $m_1$ represents the minimum energy of the cooling unit and $M_2$ the maximum energy.

Here again, a general equation like (B1) can be written and this equation minimalized for certain values of u and v (no variable q because there is no independent cooling unit).

Figure 8:
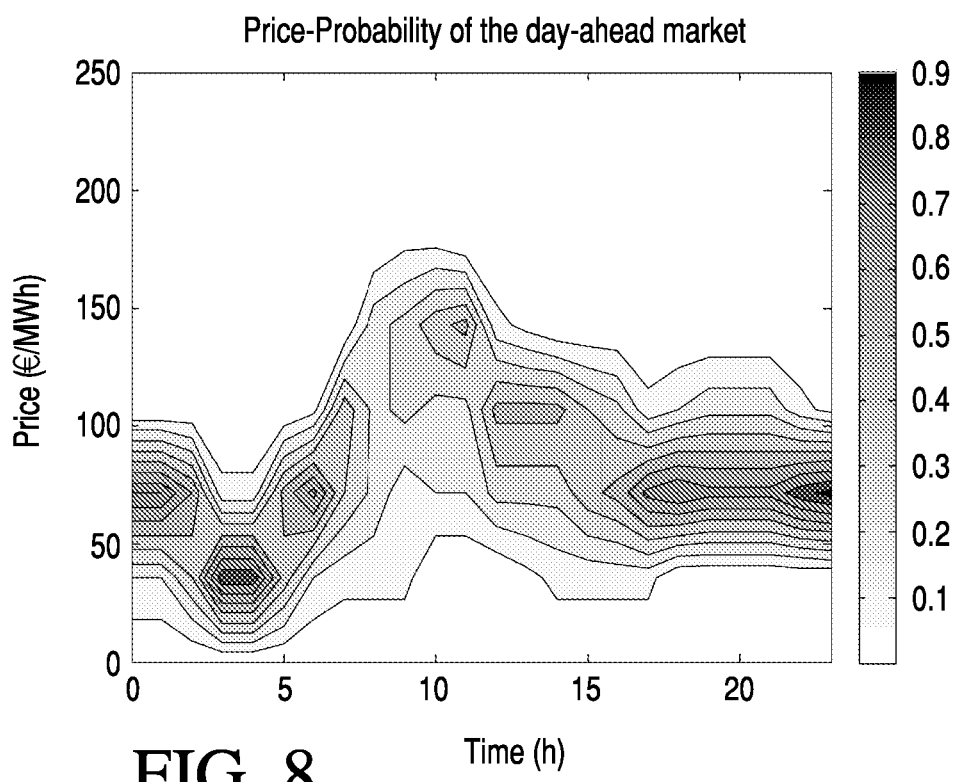
FIG. 8 shows a typical PDF of the Belpex price.

The above-described method embodiments of the present invention may be implemented in a processing system 200 such as shown in FIG. 8. FIG. 8 shows one configuration of processing system 200 that can be implemented on a mobile phone, a PDA, a laptop, a personal computer etc. It includes at least one programmable processor 203 coupled to a memory subsystem 205 that includes at least one form of memory, e.g., RAM, ROM, and so forth. It is to be noted that the processor 203 or processors may be a general purpose, or a special purpose processor, and may be for inclusion in a device, e.g., a chip that has other components that perform other functions. The processor may also be an FPGA or other programmable logic device. Thus, one or more aspects of the present invention can be implemented in digital electronic circuitry, or in computer hardware, firmware, software, or in combinations of them. The processing system may include a storage subsystem 207 that has at least one disk drive and/or CD-ROM drive and/or DVD drive. In some implementations, a display system, a keyboard, and a pointing device may be included as part of a user interface subsystem 209 to provide for a user to manually input information. Ports for inputting and outputting data also may be included, especially interfaces for capturing physical values relevant to energy consumption or generation, e.g. an interface to a CHP unit, and/or a classic heating unit, and/or a buffer and/or one or more users of energy such as a greenhouse. Interfaces may also be provided for control of fuel use by a CHP, e.g. gas as fuel, or solid or liquid fuel, waste material or garbage e.g. wood, straw, etc. More elements such as network connections, interfaces to various devices, and so forth, may be included, either by wire line or wireless connections, but are not illustrated in FIG. 8. The various elements of the processing system 200 may be coupled in various ways, including via a bus subsystem 213 shown in FIG. 8 for simplicity as a single bus, but will be understood to those in the art to include a system of at least one bus. The memory of the memory subsystem 205 may at some time hold part or all (in either case shown as 201) of a set of instructions that when executed on the processing system 200 implement the steps of the method embodiments described herein. Thus, while a processing system 200 such as shown in FIG. 8 is prior art, a system that includes the instructions to implement aspects of the methods for control of a CHP according to the present invention is not, and therefore FIG. 8 is not labelled as prior art.

The present invention also includes a computer program product, which provides the functionality of any of the methods according to the present invention when executed on a computing device. Such computer program product can be tangibly embodied in a carrier medium carrying machine-readable code for execution by a programmable processor.

The present invention thus relates to a carrier medium carrying a computer program product that, when executed on computing means, provides instructions for executing any of the methods as described above. The term "carrier medium" refers to any medium that participates in providing instructions to a processor for execution. Such a medium may take many forms, including but not limited to, non-volatile media, and transmission media. Non-volatile media includes, for example, optical or magnetic disks, such as a storage device which is part of mass storage. Common forms of computer readable media include, a CD-ROM, a DVD, a flexible disk or floppy disk, a tape, a memory chip or cartridge or any other medium from which a computer can read. Various forms of computer readable media may be involved in carrying one or more sequences of one or more instructions to a processor for execution. The computer program product can also be transmitted via a carrier wave in a network, such as a LAN, a WAN or the Internet. Transmission media can take the form of acoustic or light waves, such as those generated during radio wave and infrared data communications. Transmission media include coaxial cables, copper wire and fibre optics, including the wires that comprise a bus within a computer.

The present invention is not limited to the examples given above but other embodiments of the invention are possible. The buffer of heating installations including a CHP may be constituted by the thermal inertia of a building which is to be heated. In such an embodiment, the temperature of the building may vary between two temperatures and heat energy may be stored by increasing the temperature of the building beyond the lowest of these two temperatures.

ANNEX I

An Trading Strategy for Industrial CHP'S on Multiple Power Markets

Fjo De Ridder and Bert Cleassens Flemish Institute for Technological Research—Energy Technology, Boeretang 200, B-2400 Mol, Belgium; fjo.derrider@gmail.com

1.1 Abstract

In this paper we propose an optimal bidding strategy for industrial combined heat and power (CHP) installations, which can sell their power on multiple markets, like a day-ahead market and continuous intraday market. Each market has its own trading rules. These installations consist of a CHP, a conventional heating installation and a heat buffer. Each device has its particular constraints, like maximum and minimum heat and electrical power that can be delivered and minimum and maximum buffer capacity. Both the heat demand and the future prices on the different markets are only partly known. We assume that the probability density functions of these variables are known or can be extracted from historical data. Based on these constraints and probability density functions the bidding strategy is constructed, based on a stochastic (dynamic) programming algorithm. For a day-ahead market, the bidding functions have to be estimated in advance, which is a typical open-loop problem, while the bidding functions for a continuous intraday market can be estimated almost instantaneously. The novelty of this paper is that a hybrid open- and closed-loop optimal control scheme is proposed. This scheme is exemplified for the Belgian market.
Keywords: optimal stochastic control, multiple markets, bidding strategies, day-ahead markets, continuous intraday markets, CHP, trading, power 1. Introduction Many large buildings need lots of energy for heating. If this heat is made with classical heating installations, the costs may be severe. One way to suppress these costs is by installing CHP installations, so that beside heat, also electrical power is produced. This power can be sold on electricity markets. Lund and Andersen [1] describes the large-scale implementation of such installations in Denmark. Originally these CHP's produced power for a three-tariff structure market. In their paper, optimal performance in a variable tariff structure market is described. Many industrial gardeners use such installations today to heat glasshouses where vegetables and flowers are produced. If these glasshouses would still be heated with classical installations, the heating costs will become larger than the profits resulting from the cultivation. These large quantities of power can be traded on several markets. A popular market, where approximately 15% of the power is traded in Belgium, is the Belpex market. This is an day-ahead market, where a trader can decide how much power will be traded at every time slot during the next day. Ill predictions on shorter time scales can be traded on a Continuous Intraday Market (CIM) until 10 minutes before the actual production starts.

The first problem a trader is typically confronted with is how much power to be traded on these different markets. If all power is traded on the day-ahead market, (s)he will miss opportunities on the CIM, but if too much power is reserved for this market, profits will be lower. So, the first question our trader is confronted with is how to spread his/her power over the markets at his/her disposal? These fractions may evidently vary with time. In this context, most of the papers consider a single electricity market environment and, at most, include the consideration of long-term contracts but ignore the sequential opportunities for offering the generator's output for the different markets that may exist [2]. Several studies have addressed the problem of bidding on multiple markets [2-5]. However, all these authors focus on generator companies rather than on specific devices like CHP's. Swider provides a strategy to bid on day-ahead markets and on power system reserve markets, while Ugedo et al. [4] focus on a day-ahead market combined with a CIM. Triki et al. considers a strategy to explicitly combine multiple markets [2].

The second problem a trader is confronted with is which trading strategy to follow: which bidding strategy should be followed on the day-ahead market? Which risks should be taken? The power produced by a CHP is mainly restricted by the heat demand, so he/she should be sure that the power sold is related to tomorrow's heat demand. Philpott and Pettersen made an interesting study about purchasers' strategies on a dual market [6]. Their main conclusion is that these energy-buyers should bid under their expected needs on the day-ahead market and buy possible shortages on a CIM-like market.

The third dilemma lies at the hart of the problem: future energy prices are unknown. So are future heat demands. Still bids for the day-ahead market have to be made a day in advance. Conejo et al. [7] and Rodriguez and Anders [8] propose bidding strategies were this problem is omitted by replacing this uncertainty by expected values. For generator companies many studies have solved this problem by describing future prices as probability density functions [2, 9-12; and many others]. Lamond and Boukhtouta [13] studied bidding strategies for hydro-power installations with random inflows. Such installations are already quite similar to the CHP installations with heat buffer, we are considering.

A fourth problem for such relatively small installations are that these are not purely installed for power production purposes. Consequently, the operator does not have the time and interests to study markets and price series all day long.

All these problems can be solved by an automatization of the bidding strategies, as is proposed here. A special class of trading strategies consists of optimal control. Here the trading algorithm guarantees to find the highest profit, lowest cost with the given information about the system.

A typical feature of thermal installations is that they can quite easily store heat or cold. This enables such systems to produce heat or cold not at the moment when it is most needed, but at those moments when it is most profitable. The amount of storable heat is of course limited and these limits will play an important role in the trading strategy, because these limits, together with some other hardware limitations, will constraint the choices to be made by the trader.

To make the situation even more challenging the trading strategy is largely dependent on variables, which are hardly known, like future prices, the strategy of opponents, future heat/cold demands, machine breakdowns, etc. . . . these variables are not completely unknown: it is more probable that power prices are higher during the day than during the night. In the weekends, prices will probably lower. Heat is most wanted during the night. During the winter, a high heat demand can be caused by an open sky, resulting most probably in higher demands during the day as well, while the opposite might be true in summer: a cold open sky night is followed by a sunny day, where no heat is demanded at all. All these rules of thumb can be gathered in stochastic models, based on historical data. These models will tell our virtual trader how probable certain situations are, so that appropriate measure and strategies can be followed.

In this paper we explain a mathematically rigorous algorithm, based on stochastic dynamic programming [14], that determines the optimal bidding strategy, given the probability density functions regarding the expected demand, price . . . We treat the case of a CHP coupled to a buffer. Nevertheless our approach can be adapted to other configurations.

2. The System

Figure 10:
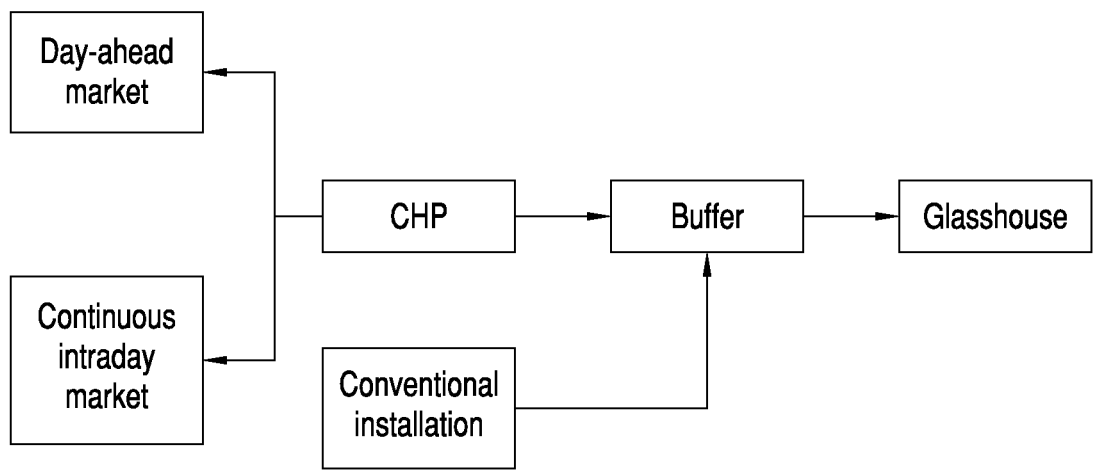
FIG. 10 shows a schematic representation of a conventional heating installation unit with a heat buffer.

To focus our minds, we will develop the control algorithm for a CHP unit, with a heat buffer and a conventional heating installation. In FIG. 10 a schematic representation of the installation is given. Here, a heat buffer delivers the heat demanded by the building (a glasshouse in this example). This heat buffer is fed by a high-efficiency conventional installation or a CHP. The CHP can sell its power on two markets: a day-ahead market, like the Belpex market and a continuous intraday market. To characterize these building blocks, three types of variables are introduced:

The stochastic parameters are used to describe those parts of the system of which we do not have full information, like the future prices on the different markets, the future heat demand. It is impossible to precisely predict the future outcome of these variables. Instead of dealing with only one possible 'reality' of how the process might evolve, in a stochastic or random process there is some indeterminacy in its future evolution described by probability density functions (PDF's) [15]. Here, we will use historical data to construct the PDF's of future values.

State space variables are deterministic variables, which are used in the mathematical model to determine the future states of the system. In this example, the only state space variable is the State-of-Charge (SoC) of the buffer.

Control variables are those state space variables which we can command of to guide the system to its optimal behavior.

1.1.1 2.1 The Glasshouse

Figure 7:
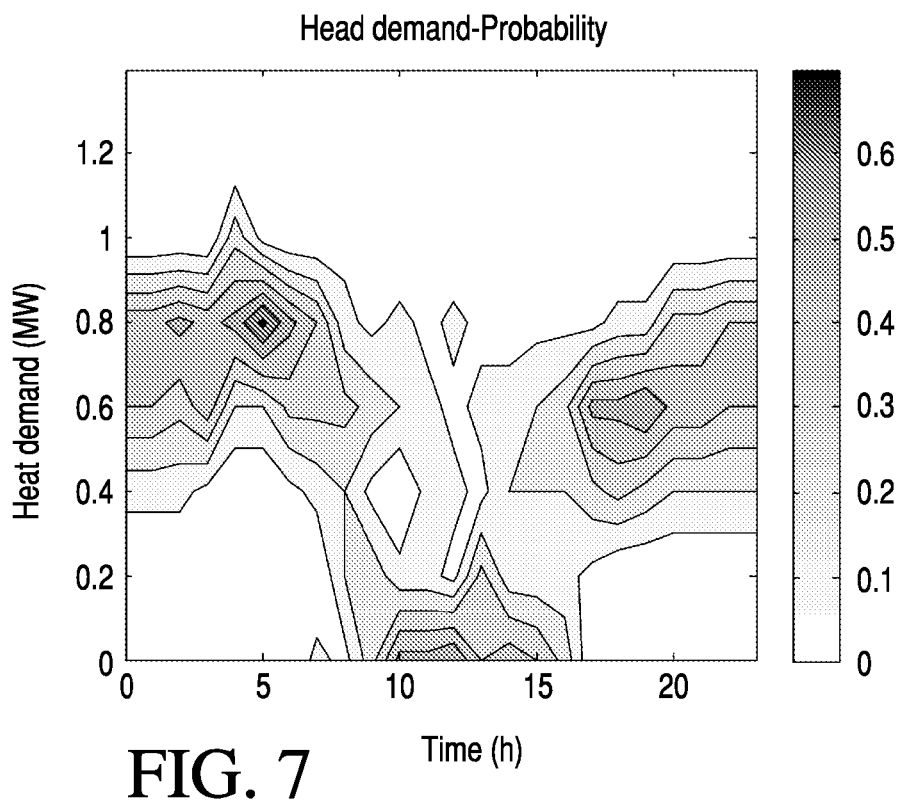
FIG. 7 shows an example of the heat demand for the modeled glasshouse.

Most vegetables in Belgium are produced in glasshouses. If these glasshouses would be acclimatized with a classical installation, the costs would be too high to make any profits. For that reason, many horticulturists make use of CHP's. Often these CHP's are so huge that trading the produced power has become more important than producing vegetables. For that reason, we have chosen to use this industry as a case study. The modeled glasshouse is 5000 m² and an example of the heat demand is shown in FIG. 7. We assume that the heat demand is not correlated, while one may expect that this is the case in reality. However, this correlation can quite easily be taken into account as well.

1.1.2 2.2 The Buffer

A buffer is installed to produce power when electricity prices are high and deliver heat whenever the glasshouse is demanding heat. In practice these buffers can be large and can consists of up to 3000 m³ water, which can be heated up to 95° C. The return temperature is typically around 40° C., resulting in a heat capacity of 25 MWh. In this study the heat that can be delivered by the buffer is no function of the State-of-Charge, SoC. Consequently, the only parameter necessary to describe the state of the buffer is its SoC. It will turn out that this is the only state space variable present in the system.

1.1.3 2.3 Conventional Installation

Heat is supplied to the buffer by a CHP and a conventional installation. This conventional installation consumes gas and produces heat with a high efficiency, which is typically over 90%. The heat produced can be modulated from 30-100% (405 kW to 1350 kW thermal power in this example). The amount of gas supplied to this installation is a control parameter $q_{CI}$ [kW].

1.1.4 2.4 Combined Heat and Power Installation

A CHP installation produces heat and power simultaneously. Preferentially this installation is supplying heat to the buffer, so that the produced power can be sold. Compared to the conventional installation the thermal efficiency is lower, typically around 50%, while the electrical efficiency is typically around 40%. The modulation range of this installation is smaller and ranges from 70-100% (560 to 800 kW thermal power). In this study, efficiencies do not change when the power is modulated. The maintenance cost of CHP's is taken into account at 5 € per active hour. The thermal and electrical power generated by the CHP is a control parameter u [kW]. This control parameter represents the amount of gas supplied to the CHP.

1.1.5 2.5 The Markets

The electrical power produced by the CHP can in this example be sold on two markets: a day-ahead market and a continuous intraday market. We have chosen for these two markets because biddings on the first have to be made in advance, while power can be sold almost instantaneously on the second. These two markets act on different time scales. For the Belpex all control actions must have been taken a day in advance, while for the CIM market, control actions needs to be finished only ten minutes before excecution. Similar scaling problems may occur when long term contracts (EN-DEX market for example) are combined with e.g. the Belpex market.

1.1.6 2.5.1 Day-Ahead Market

The Belpex was chosen as example for a day-ahead market. In Belgium 14% of all power is traded on this day-ahead market. Traders who want to sell or buy power on this market do this by sending bidding functions to this market. A bidding function presents the amount of power [kW] to be traded as function of the price [€/MWh]. Evidently, a trader who is selling power, will send increasing function, while someone interested in buying power, will send decreasing functions. For every hour such a bidding function can be sent, so that different amounts can be traded during the day. On the other hand, since the day-ahead market prices are unknown at the time of bidding, block bids protect against unexpected price changes over time and have their relevance [9]. We did not take block bids into account.

Sending such bidding function can be done until 6 a.m. of the day before power is actually traded. At 11 a.m. the market sums all biddings and calculates the market-clearing price. At this moment, traders receive an allocation, telling them how much power have to be produced and what the corresponding price will be.

In reality, an additional check is performed to see if the power grid is able to transport the power during the next day and possibly measures are taken if this would not be the case (see e.g. [16, 17]). We have ignored this geographical aspect of the power matching.

FIG. 8 shows a typical PDF of the Belpex price. These PDF's are constructed similar to the PDF's of the heat demand: to construct a PDF for a given hour of a given day, data from the same hour of all days ranging from one week before to one week after the particular day are gathered and a histogram of these data is used. Notice that several features remain present in these PDF's: prices are higher during the day than during the night. The variability is smallest at 6 am and highest around 10 a.m. During winter months this structure is different with e.g. peaks in the evening due to lighting.

1.1.7 2.5.2 Continuous Intraday Market

The continuous intraday market is a smaller market than the Belpex and is meant to trade unexpected or unpredicted power excesses and shortages.

This can again be done in time slots of one hour and the trader can put his demand or excess power on this market starting 24*h* in advance until 10 minutes before the respective time slot. In contrast with the Belpex market no matching is used. If a trader wants to sell power, he/she can put the amount of power [kW] on the market at a given price [€/MWh]. If a buyer is interested, he/she can buy this package. Possibly, no interested buyer shows up and the power is not traded at all.

Figure 9:
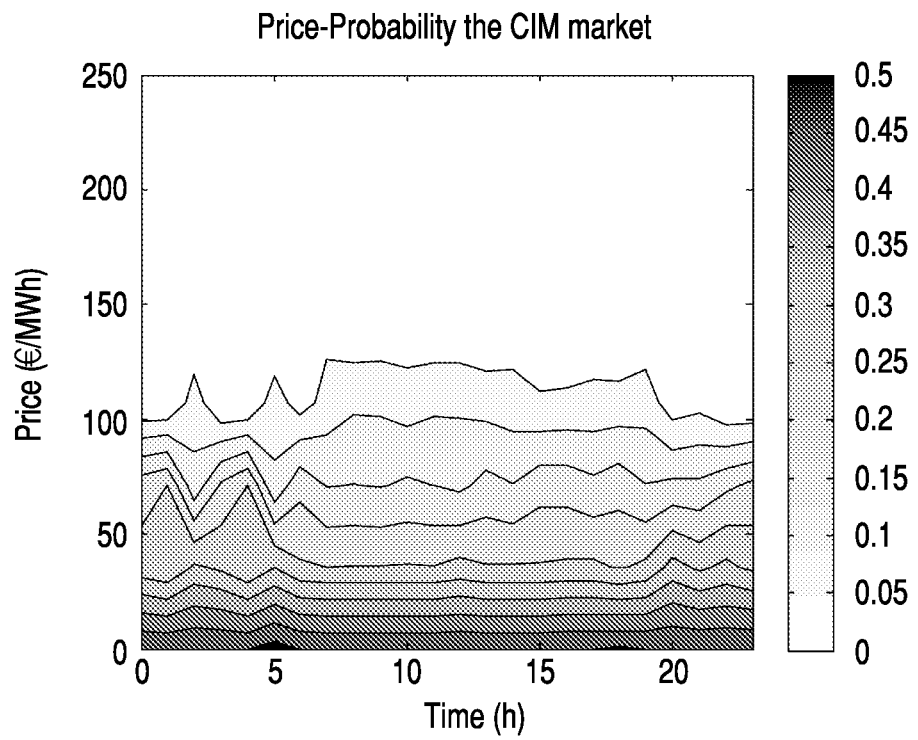
FIG. 9 shows price probability the CIM market.

Actually this market is described by two stochastic parameters; the price at which power can be traded and the probability that a interested party shows up. For reasons of simplicity, these two variables are combined. If no interested party shows up, the price is simple zero. This leads to PDF's as are shown in FIG. 9. So compared to the day-ahead market, the CIM offers a larger flexibility. This can be used to tune the system instantaneously in the desired directions. The price for this flexibility is lower expected profits. In reality the CIM and day-ahead prices are correlated: if one is high, one may expected that the other would be higher as well. Such correlations are not taken into account. This correlation effect will slightly bias the results: the additional profits, which can be made by bidding on two markets, will be slightly lower in reality.

On the day-ahead market, the biddings have to be produced before the controller is operating the actual day. So this is actually an open-loop problem, since no feedback is possible during the operation. On the CIM, bidding strategies can be adapted during the operation. This type off control is called closed-loop. Chronologically, the bids on the day-ahead market have to be made first, but these bids will depend on the tuning freedom left on the CIM. So in the algorithm, the computational order is reversed: first the CIM actions, then the day-ahead actions are calculated (see FIG. 10). This hybrid open- and closed-loop approach enables us to separate actions on different time scales and will also appear when e.g. long term contracts have to be compared with a day-ahead market.

3. Algorithm Development

The goal is to find those bidding strategies that result in the highest profits. Translated into mathematics, this is a optimal control problem, where the bidding strategy is found by identifying the optimal control parameters. Since several of the model parameters, like the heat demand of the glasshouse and the power prices on the markets are only partially known, stochastic parameters are involved. The most obvious solution could consist of replacing the stochastic variables by their expectation value. Under this assumption the problem would reduce to a deterministic control problem. However, the algorithm would no longer be able to profit e.g. from unexpected high prices on the CIM market or to avoid lower-than-average prices on the day-ahead market. For this type of stochastic control problem, only a few kinds of algorithms are available. We used stochastic dynamic programming [14].

Dynamic programming algorithms are built according to a fixed outline: first the terminal profit function is defined. From this equation, the optimal control parameters for the last operational step are identified and a profit function for the last step is constructed. This profit function is used as terminal profit to identify the controls of the previous step. Typically a set of control parameters is estimated for every position of the state space and this is done starting at the end of the control horizon, moving backwards to the beginning. Such types of control schemes have the advantage that all controls can be characterized in advance; so no real time computer power is necessary.

3.1 Constraints

The system is restricted on three levels:
The state of charge of the buffer cannot be negative and the buffer capacity has an upper bound $$0 \leq x_k \leq x_M \tag{1}$$

The gas delivered to the total system is limited, meaning that not both the CHP and conventional installation can run simultaneously on full power $$u_k + q_k + v_k \leq M_1 \tag{2}$$

The power delivered by the CHP has an upper bound $$u_k + v_k \leq M_2 \tag{3}$$

These constraints are evident, but will largely influence the trading strategies and have thus a huge importance.

1.1.8 3.2 Evolution Equation

The system under consideration has only one state space variable, i.e. the state of charge of the buffer. Since the buffer is connected to the CHP, the conventional installation and the glasshouse, its evolution can be expressed as follows $$x_{k+1}(x_k, u_k, v_k, q_k, w_k) = x_k + \eta_h(u_k + v_k) + \eta_{Cl} q_k - w_k \tag{4}$$

In this equation, we ignored heat losses of the buffer installation, because these are usually very small.

3.2 Initialization of the Terminal Profit

In order to start up the optimization algorithm, a terminal profit function has to be defined. This terminal profit function associate a future profit to the state of charge of the buffer. As one might expect, it makes a difference if the buffer if full or empty at the end of the day. In the first case, no electrical power can be produced, because the heat cannot be stored, but on the other hand a full buffer is at hand to provide heat if demanded. We could not find an analytical expression for this terminal cost and initialized it uniformly $$P_N(x) = 0 \tag{5}$$

This terminal profit function is probably not optimal, but we will show later in this article how it can be updated to converge toward the optimal profit function. This equation should only be interpreted as a kind of initialization.

3.4 Stage Profit

Next, a profit is calculated for every combination of control variables ($u_k, v_k, q_k$) and stochastic variables ($p_k, r_k$; note that $w_k$ has no influence on the profits made). For some combinations of these parameters, it is possible that some constraints are violated.

If $x_k < 0$ (impossible situation: buffer has a negative SoC)

$$2 \; P^{stage}_k(u_k, v_k, q_k, p_k, r_k) = -\infty \qquad (6)$$

3 Otherwise If $x_k > x_M$ (The Buffer is Full, thus the Power Sold on the Day-Ahead Market cannot be Delivered and a Penalty Fee has to be Paid)

$$P^{stage}_k(u_k, v_k, q_k, p_k, r_k) = -\eta_{el} u_k p_k (1 + \text{penalty}) \text{ otherwise}$$
(SoC has an intermediate level)

$$4 P^{stage}_k(u_k, v_k, q_k, p_k, r_k) = \eta_{el}(u_k p_k + v_k r_k) - p_{gas}(u_k + v_k + q_k) - M(u_k \neq 0 \lor v_k \neq 0)$$

The first term is the profit made on the day-ahead and continuous intraday market, the second term takes gas consumption into account and the last term is a maintenance cost associated with operating the CHP installation. The penalty is typically around 8% in Belgium. Angarita and Usaola [18] describe a trading strategy, which also takes such penalties into account. Soleymani et al. [19] goes one step further then we do and take the reliability of the unit into account as well.

3.5 Profit-To-Go

The profit to be made by following a certain strategy does not consist only of the instant profit, but also by the profit to be made in the future. It might for instance be attractive to develop a strategy to choose always for the highest profit at hand. However, such strategies do not lead to profit maximization. In our case, this would mean that the buffer is filled as soon as possible, i.e. during the night, while electricity prices are lowest during this period. To overcome this temptation, the stage profit is extended with the profits to be made in the future. This extended profit function is usually called the profit-to-go.

$$P^+_k(x_k, u_k, v_k, q_k, p_k, r_k, w_k) = P^{stage}_k(u_k, v_k, q_k, p_k, r_k) + P_{k+1}(x_{k+1}) \qquad (7) \text{ with } x_{k+1} = x_{k+1}(x_k, u_k, v_k, q_k, w_k)$$

The second term constitute of the profit made at the next time instance, evaluated at the state, which results from the control and stochastic variables. Note that the last stochastic variable, i.e. the heat demand, enters the equations again via the evolution equation.

This stage profit is a seven dimensional array, which provide us the profits to be made for every possible combination of control and stochastic variables. Unavoidably, one combination in this array must be the optimal combination.

3.6 Selection of the Closed-Loop Control Parameters

The amount of power sold on the continuous intraday market and the heat provided by the conventional installation can be tuned instantly and may vary according to changes in all other parameters. For that reason, both are so-called closed loop control parameters and can be identified by selecting those values that maximize the profit-to-go $$[v^*_k(x_k, u_k, p_k, r_k, w_k), q^*_k(x_k, u_k, p_k, r_k, w_k)] = \qquad (8)$$
$$\underset{v_k, q_k}{\operatorname{argmax}} P^+_k(x_k, u_k, v_k, q_k, p_k, r_k, w_k)$$

These optimal control parameters tells the operator how to handle on the CIM and how to operate the conventional installation at every instant $t_k$ as function of the state space parameters, the outcome of the day-ahead bidding ($u_k, p_k$) and the realization of the stochastic variables ($r_k, w_k$).

If the profit-to-go is evaluated at these maxima, a lower dimensional profit function remains $$P^1_k(x_k, u_k, p_k, r_k, w_k) = \max_{v_k, q_k} P^+_k(x_k, u_k, v_k, q_k, p_k, r_k, w_k) \qquad (9)$$

To find the optimal value for the bidding on the day-ahead market, this strategy cannot be used, because biddings have to be provided almost a day in advance. In other words, the power provided to the day-ahead market can only be function of the price on this market, but not on any other control or stochastic parameter.

3.7 Selection of the Open-Loop Control Parameters

Due to the trading rules on day-ahead markets, the optimal bidding functions have to be estimated as open-loop control parameters. In this section a strategy will be proposed to identify the optimal parameter $u_k(p_k)$. The best way to achieve this is by calculating the expectation value over ($x_k, r_k, w_k$). However, at this stage the probability to be in a state $x_k$ is not known and thus no expectation value over this variable can be calculated. This can easily be understood: to know the probability to be in state $x_k$, one has to know the control parameters which have been applied in the time steps $t_1$ to $t_{k-1}$ and these controls will depend on the Profit-to-go at this time $t_k$. The expectation value for $r_k, w_k$ is $$P^2_k(x_k, u_k, p_k) = \underset{r_k, w_k}{E} P^1_k(x_k, u_k, p_k, r_k, w_k) \qquad (10)$$

The second best way to remove the variable $x_k$ is by implementing a MinMax approach [Bertsekas, 2007].

$$P^3_k(u_k, p_k) = \min_{x_k} P^2_k(x_k, u_k, p_k) \qquad (11)$$

From this profit function, the control parameters $u_k(P_k)$ can be identified.

$$u^*_k(p) = \underset{u_k}{\operatorname{argmax}} P^3_k(u_k, p_k). \qquad (12)$$

Figure 11:
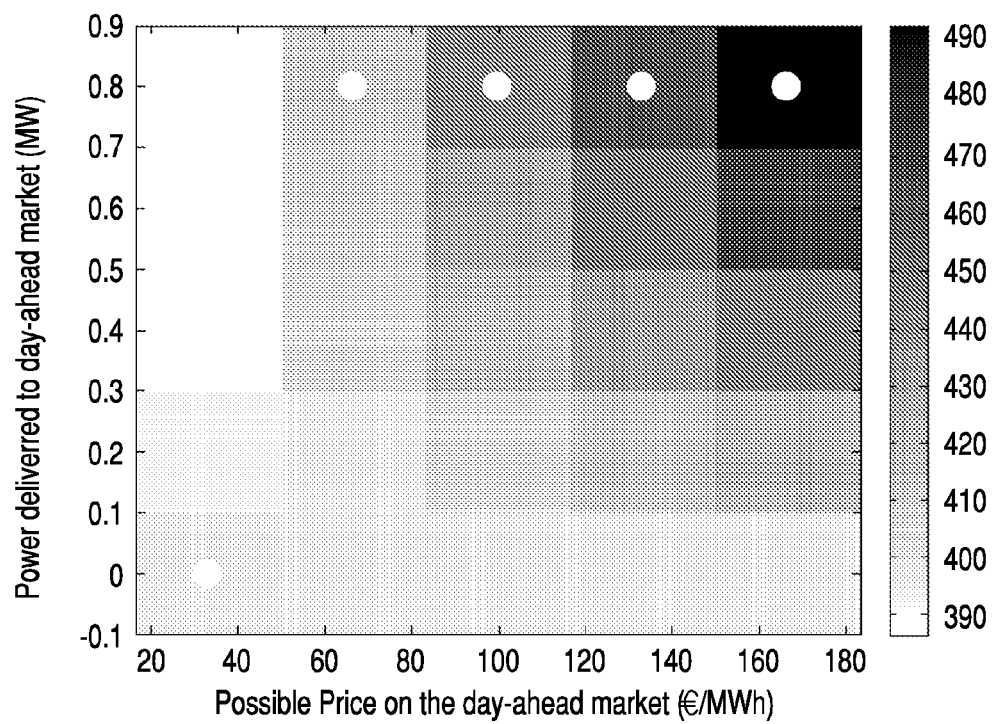
FIG. 11 illustrates the principle described in paragraph 3.7 of Annex I below.

FIG. 11 illustrates the principle. First the profit function $P^3_k(u_k, p_k)$ is constructed. This is a two-dimensional function, depending on the gas power used to produce energy for the day-ahead market and the potential price gathered at this market. This matrix can be used to select the bidding strategy on this market. This is illustrated by the dots: if the price is too low, no power is delivered (first column at the left), once the price is higher than about 60 €/MWH the system is willing to operate at full power.

These controls are the optimal control parameters if our system would be in the worst state. In any other state higher profits can be reached; so by implementing this MinMax approach, we guarantee an under bound for the profit made and ensure that our system remain stable.

3.8 Identification of the Control Parameters at the Previous Time Step

All control parameters at time $t_k$ are now identified. Next, the strategy to identify the control parameters at time $t_{k-1}$ will be explained. To reach this goal a 'terminal profit function' at time $t_k$ has to be constructed. This function should only depend on the state parameter $x_k$ and can be calculated from the Profit-to-go by eliminating the control parameters $$P^*_k(x_k,p_k,r_k,w_k) = P^+_k(x_k,u^*_k,v^*_k,q^*_k,p_k,r_k,w_k) \cdot v^*_k(x_k,u^*_k,p_k,r_k,w_k)$$

with $q^*_k(x_k,u^*_k,p_k,r_k,w_k)$ $$u^*_k(p_k) \tag{13}$$

and by calculating the expectation value over all stochastic variables $$P_k(x_k) = \underset{p_k,r_k,w_k}{E}\{P^*_k(x_k, p_k, r_k, w_k)\} \tag{14}$$

This expression is identical to the terminal cost function, except that it is evaluated at time $t_k$ instead of time $t_N$. The procedure can be repeated until all control parameters are identified.

3.9 Iterative Improvements

So far we have been unable to identify the optimal bidding strategy due to two major difficulties: identification of the terminal profit function and estimation of the probability to be in a certain state at time $t_k$.

To overcome the first problem, we assume that the day over which we want to characterize the optimal control strategy is just one day in a row of identical days. Under these cyclic conditions, the profit function $P_l(x)$ at time $t_l$ can be used as an improved estimate for the terminal profit function $P_N(x)$ for the previous day. After a couple of iterations, this terminal profit function converges. It can be shown that the terminal profit function does converges to the true optimal one (so-called value iteration [Bertesekas, 2007]). In our strategy to find the optimal biddings, this means that we will leave our system in such a state that the profits to be made in the next day are not jeopardized, if all stochastic parameters would be identical to the current ones. The latter is not necessarily true: power prices, for example, are usually cheaper during the weekends than during week-days. Such effects are thus ignored.

Now that a set of worst-case control parameters are known, it becomes possible to construct the PDF of the state at every time step. To reach this, we start from the PDF at the first step and assume that this 'current' PDF $f_j(x)$, is known. From this knowledge, the PDF at the next time step $f_{k+1}(x)$, can be calculated.

The probability to reach a state $x_i$ is given by the Chapman-Kolomogrov equation $$f_{k+1}(x_i) = \sum_j f_k(x_j) f_k(x_j \to x_i) \tag{15}$$

with $f_k(x_j)$ the probability to be in state $x_j$ at time $t_k$ and $f_k(x_j \to x_i)$ the probability to make the transition from state $x_j$ to state $x_i$ at time $t_k$. The latter is given by $$f_k(x_j \to x_i) = \sum_m \sum_n f_k(p_m) f_k(w_n) \delta(x_j - x_i) \tag{16}$$

with $f_k(p_m)$ and $f_k(w_n)$ the probabilities for respectively a price $p_m$ and a heat demand $w_k$ at time $t_k$ and $\delta()$ the Dirac distribution. The state $x_i$ can be calculated as follows $$x_i = x_j + \eta_{th}(u^*_k + v^*_k) + \eta_{HJ}q^*_k - w_n \tag{17}$$

Herein are the control parameters evaluated on the discrete grid of the stochastic variables $$u^*_k = u^*_k(p_k)$$

$$v^*_k = v^*_k(x_k, u^*_k(p_k), p_k, r_k, w_k)$$

$$q^*_k = q^*_k(x_k, u_{*k}(p_k), p_k, r_k, w_k) \tag{18}$$

With this scheme the PDF of the state can iteratively be calculated from $t_1$ to $t_N$. So only in the first iteration the PDF's are unknown and the MinMax scheme have to be used, but from the second iteration onwards equation (11) can be replaced by $$P^3_k(u_k, p_k) = \underset{x_k}{E}\{P^2_k(x_k, u_k, p_k)\}, \tag{19}$$

where the expectation cost is used to identify the optimal bidding strategy.

4 Implementation

Figure 12:
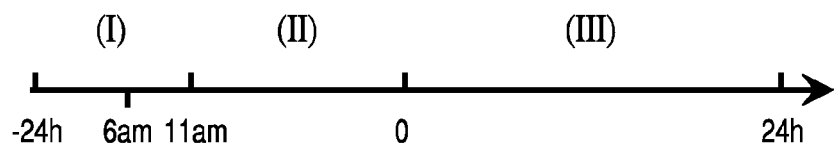
FIG. 12 shows a scheme of different situations.

The scheme proposed in the previous paragraph does not have to be calculated for every hour of a day. Mostly, it can be simplified. FIG. 12 shows the different situations that occur during a typical day-cycle. For the first day, the next scheme can be used:

Situation (I): this cycle starts 24 h in advance. From this moment onwards it is possible to bid on the CIM market for the first hour of the day. For the next 24 h bidding it becomes possible to bid for the next hour.

$$v^*_k = v^*_k(x_k, u^*_k(E\{p_k\}), E\{p_k\}, r_k, w_k) \tag{20}$$

At 6 am the bidding functions $u^*_k(p_m)$, have to be sent to the day-ahead market. PDF of the state can be calculated by implementing equations (15) and (16) with $x_{t=6}$ as initial value.

Situation (II): at 11 am allocations are returned. From this moment onwards, the biddings for the CIM market are evaluated at the allocation price $$v^*_k = v^*_k(x_k, u^*_k(p_{allocation}), p_{allocation}, r_k, w_k) \tag{21}$$

Situation (III): the dynamic programming scheme does not have to evaluated any longer from $t_{N=24}$ to $t_{N=1}$, but only from $t_{N=24}$ to $t_{actual}$.

For subsequent days, the initial PDF (at $t_l$) will change, due to changing heat demand on the previous day and to changing success on the CIM market. For that reason, it will be necessary to update the control scheme each time the initial PDF has changed.

5 Application Example

First a sensitivity analysis is discussed to gain some insight in the system's behavior and in the most important parameters. Next, an evaluation over a longer period is discussed to illustrate the advantages of this approach.

One arbitrary day, April 10$^{th}$ is used to exemplify the control scheme. The system's parameters can be found in Table 1. We have chosen to initiate the system with a relatively filled buffer (SoC=73%).

TABLE 1

System parameters for the sensitivity analysis.

| System | Parameter | Value |
|---|---|---|
| CHP | Minimum Power (MW gas) | 1.4 |
| | Maximum Power (MW gas) | 2 |
| | Thermal efficiency (scalar) | 0.5 |
| | Electric efficiency (scalar) | 0.4 |
| | Maintenance cost (€/h) | 5 |
| | Number of bins for day-ahead market | 8 |
| | Number of bins for CIM market | 8 |
| Thermal buffer | Maximum Capacity (MWh) | |
| | Number of bins | 20 |
| Conventional heating installation | Minimum Power (MW gas) | 0.375 |
| | Maximum Power (MW gas) | 1.5 |
| | Efficiency (scalar) | 0.93 |
| General | Gas price (€/MWh) | 17 |
| | Imbalance fee (%) | 0.08 |
| Day-ahead market | Under bound (€/MWh) | 0 |
| | Upper bound (€/MWh) | 250 |
| | Number of bins | 8 |
| CIM market | Under bound (€/MWh) | 0 |
| | Upper bound (€/MWh) | 250 |
| | Number of bins | 8 |
| Heat Demand | Under bound (MW) | 0 |
| | Upper bound (MW) | 1.4 |
| | Number of bins | 8 |

5.1 One Day at the Day-Ahead Market

Figure 13:
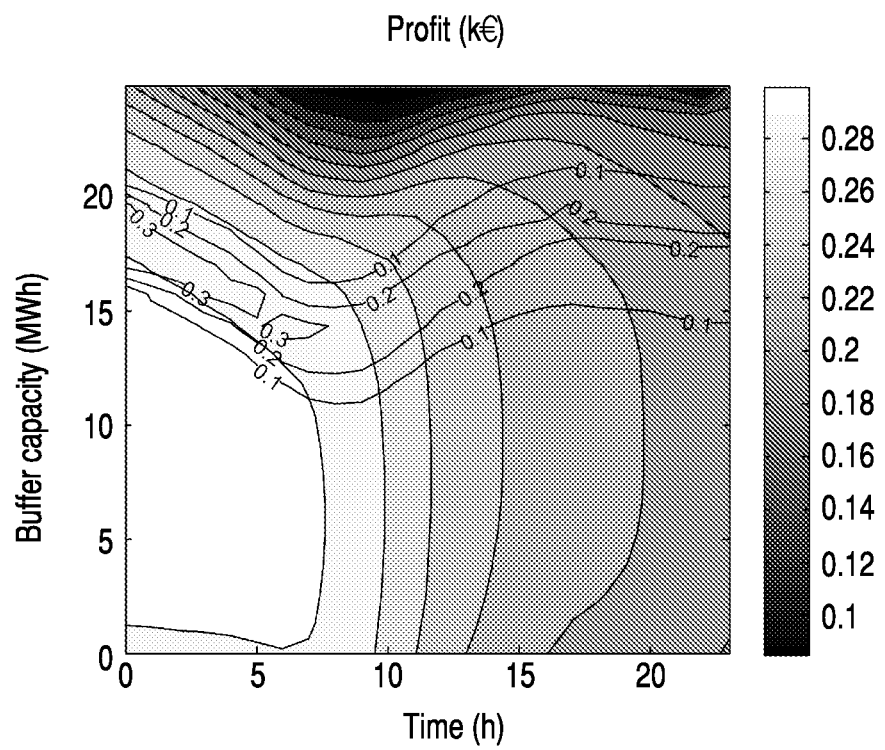
FIG. 13 shows the evolution of the day-ahead market system.
Figure 14:
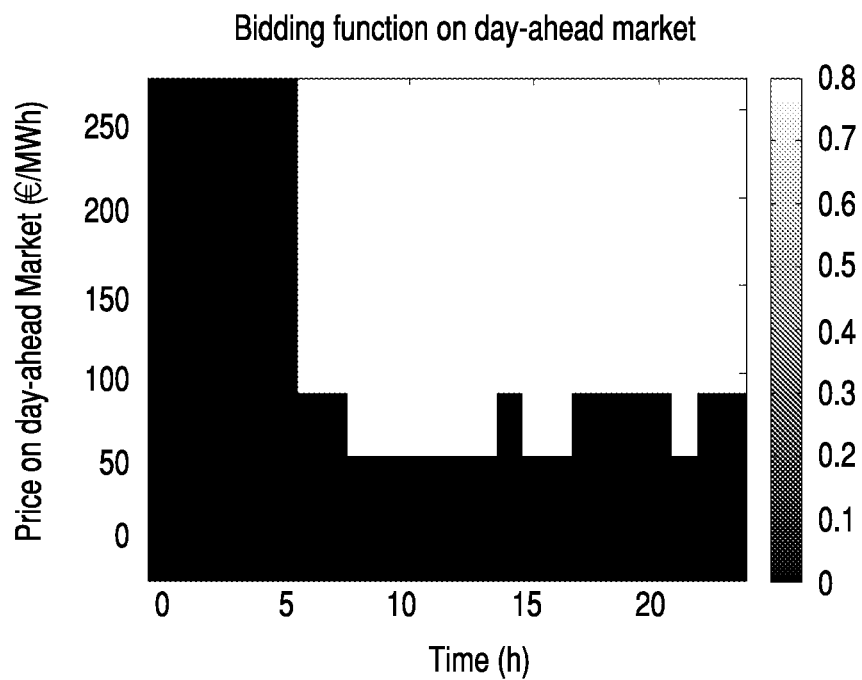
FIG. 14 shows bidding strategy on the day-ahead market.

Firstly, only the day-ahead market is considered. The evolution of the system is described in FIG. 13. At the moment of this simulation, it was still unsure in which state the system will be. This is simulated with an equally spread distributed between 17 and 19.6 MWh. The heat demand is largest during the night and the prices are lowest. So during the first hours, the state decreases. In FIG. 13, the numbered lines represent the probability to find the system in this state. The cumulative profits shown are those calculated by the dynamic programming algorithm. FIG. 14 shows the bidding strategy on the day-ahead market. During the first hours, no bids are made. Even if the price would be 250 €/MWh, the controller will not produce power. This might seem strange. However, the probability to have such a price is zero, according to the price PDF (FIG. 8). If a non-zero probability would exist, biddings are generated. The biddings are binary: or full power can be delivered or no power will be delivered. This strategy depends on the particular settings. From 5 am prices start to increase and the controller starts to bid. This results in an increase of the buffer state, especially because heat demand starts to decrease during the day. Towards the evening, prices remain relatively high and the controller remains active on the market. At this stage, the heat demand increases again, resulting in a steady state. The expected profit if the system would bid only the day-ahead market is 125 € on this particular day.

5.2 Bidding on Two Markets

If the system is allowed to bid on a day-ahead market and on a CIM, profits can raise significantly. In the example the expected profit increased from 125 to 163 €/MWh. This increase is largely caused by the added flexibility of a CIM market. On this second market bids can be made until ten minutes before the power has to be delivered.

Here the controller can use a feedback to drive the system in the desired direction. If it can only bid on day-ahead markets, the bids are concretized a day in advance. So changes, due to e.g. changing weather conditions or model errors cannot be corrected. The system has to guarantee that all constraints are satisfied, so prudency prevents it to make higher profits. Although the expected profits on this CIM market are smaller than on the day-ahead market, the combination of both markets can cause a huge increase in the expected profits.

Figure 15:
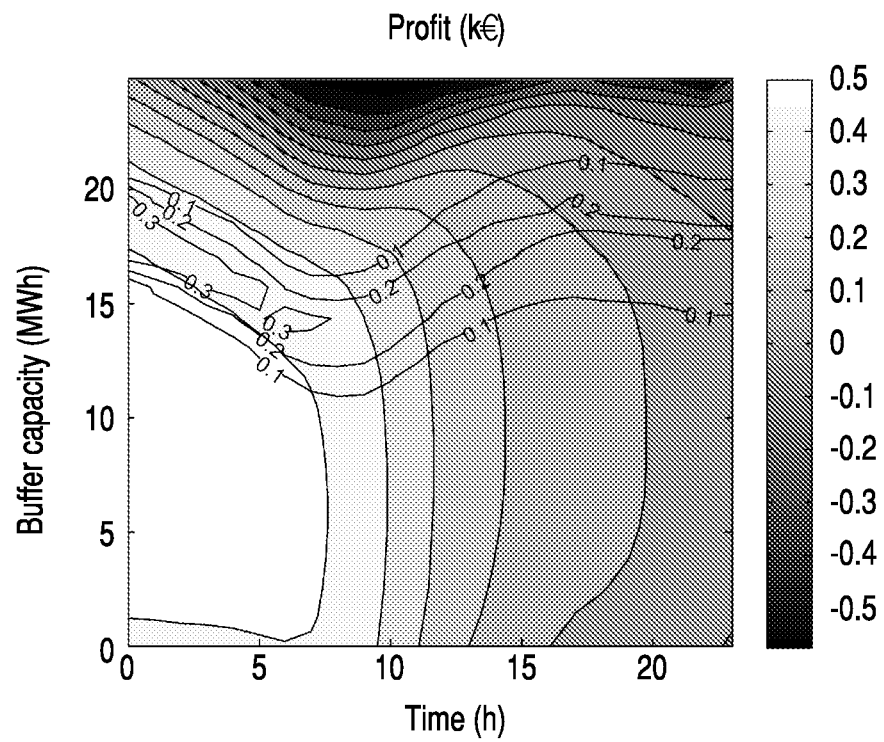
FIG. 15 shows expected profits and the state probabilities.
Figure 16:
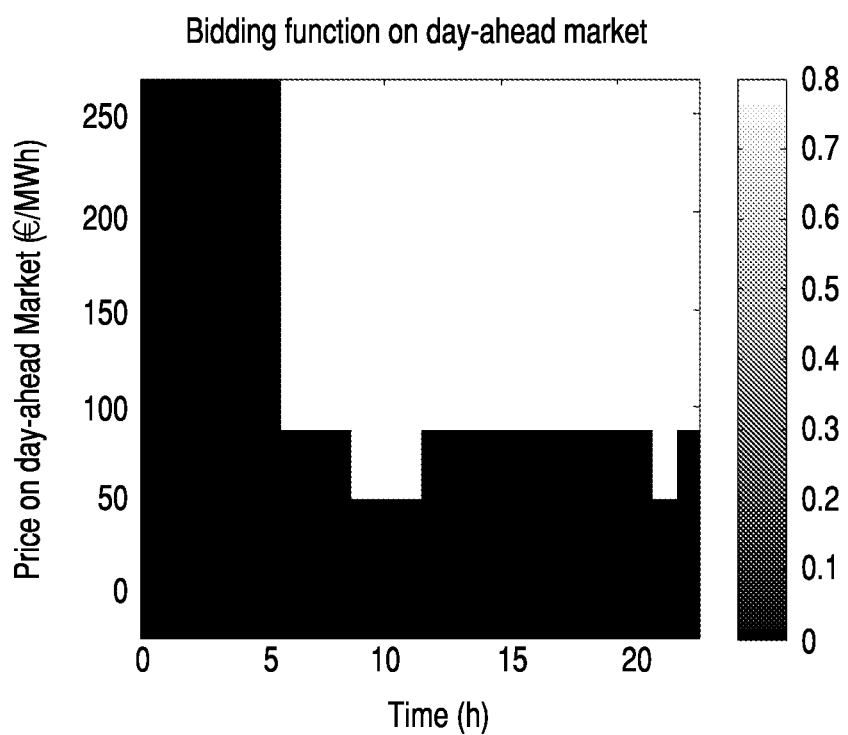
FIG. 16 shows biddings on the day-ahead market.

FIG. 15 shows the expected profits and the state probabilities. In general the evolution of the system and profits are very similar to those resulting from bidding only on the day ahead market (FIG. 13). This is not surprisingly, since most of the profit is still made on the day-ahead market. FIG. 16 shows the biddings on this day-ahead market. The moment when the system starts to bid and the general structure of the bidding functions are identical. Only at the lower price ranges, the latter control system seems to be more prudent, resulting in higher minimum prices. This will result in higher probabilities for unsuccessful biddings, but precisely this risk can be countered later on via the feedback on the CIM market.

Figure 17:
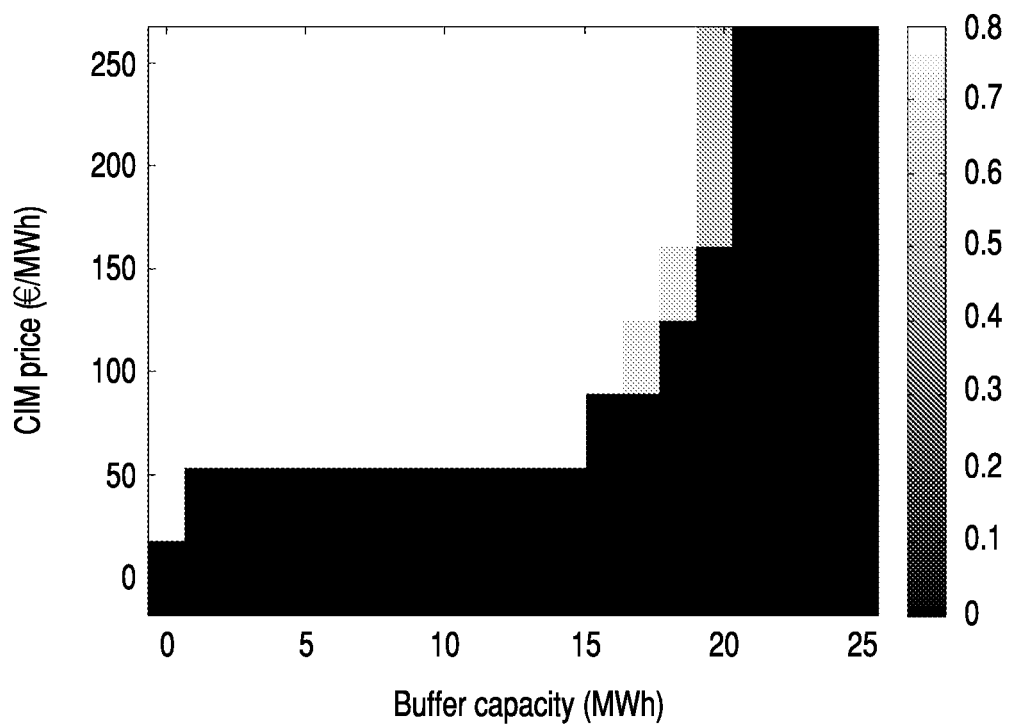
FIG. 17 shows bidding on the CIM.

The bidding on the CIM is illustrated in FIG. 17. Here the situation is shown at 7 am, with a heat demand of 800 kW and an allocation price at the day-ahead market of 36 €/MWh. As can be seen in, this allocation results in no power delivery to the day-ahead market. If the buffer is completely empty, the controller is willing to sell power if the price is higher than 36 €/MWh. For this price the system can operate at its marginal cost. If some capacity is left, this minimum price is raised to 72 €/MWh, so that some profit can be made. At the other end of the spectrum, no bids are made on the CIM if the buffer is full. Between these two situations, sometimes the controller decides to bid not its full power. This strategy results from the constraints. If full power would be sold, this would jeopardize future bids and lower possible profits.

Figure 18:
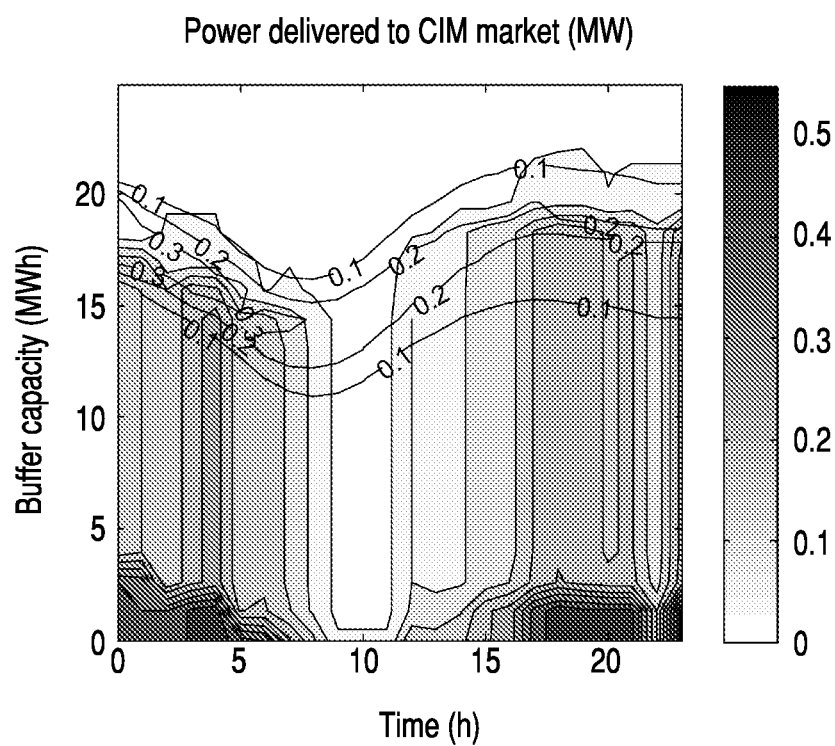
FIG. 18 shows the evolution of the bidding strategy on the CIM.

FIG. 18 shows the evolution of the bidding strategy on the CIM as function of the SoC of the buffer. There is an optimal path, which the controller tries to follow. If the buffer state transcends this optimum, the controller lowers its bids. This results in hardly any bids above a SoC of 20 MWh or higher. On the other hand the highest bids can be found when the buffer is nearly empty. Most activity on the CIM is noted when the controller is not active on the day-ahead market (0-5 am) or when the bids on the day-ahead market have a lower probability to be successful (17-24 h). The controller does hardly bid on the CIM when the bids on the day-ahead market are likely to be successful (around 10 am and at 23 h).

5.3 Maintenance Cost

Figure 19A:
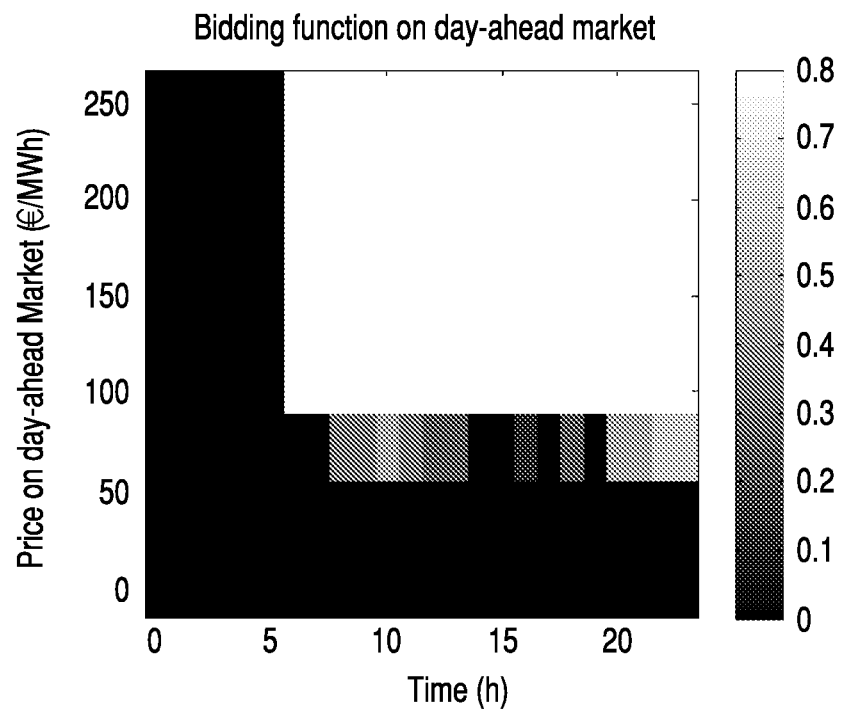
FIGS. 19a and 19b show the influence of cost on bidding behavior.
Figure 19B:
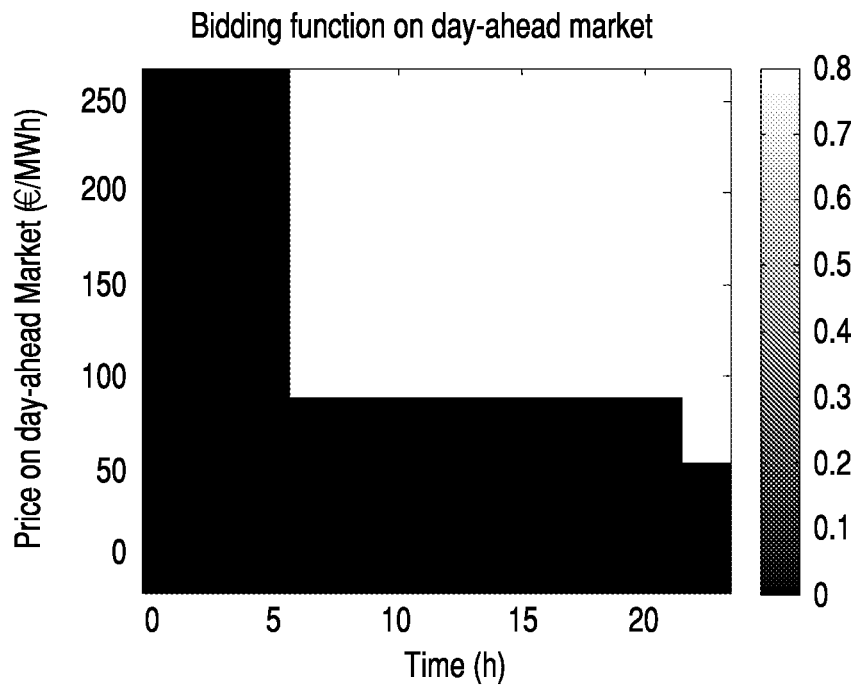

The maintenance cost is a parameter with a large impact on the bidding function; because it defines to a large extend the marginal costs of the system (together with the gas price). The influence of this cost on the bidding behavior is shown in FIG. 19. FIG. 19a shows the bidding when maintenance costs are ignored. If the price is low, this controller will bid not its full power. The results for a maintenance cost of 5 €/h are already shown in FIG. 16. Note that biddings at intermediate power have disappeared already. If the maintenance cost is increased to 20 €/h (FIG. 19b), the controller becomes even more prudent and increases the minimum price to deliver power.

To illustrate the importance of correctly estimate the maintenance costs, the profits are calculated under three conditions: 0, 5 and 20 €/h maintenance costs. In the first case, the controller decides to run during 14 h/day, which decreases to 9 and 8 h respectively (Table 2). The corresponding profits ranges quite a lot. If the true maintenance costs would be 5 €/h, the profit in the first case would decrease to 167 €, while it would increase to 140 € in the latter.

TABLE 2

Profits and activity as function of the maintenance cost.

| Maintenance (€/h) | 0 | 5 | 20 |
|---|---|---|---|
| Estimated profit (€) | 237 | 164 | 35 |
| True profit (€) | 167 | 164 | 140 |
| Number of active hours | 14 | 9 | 8 |

Figure 20:
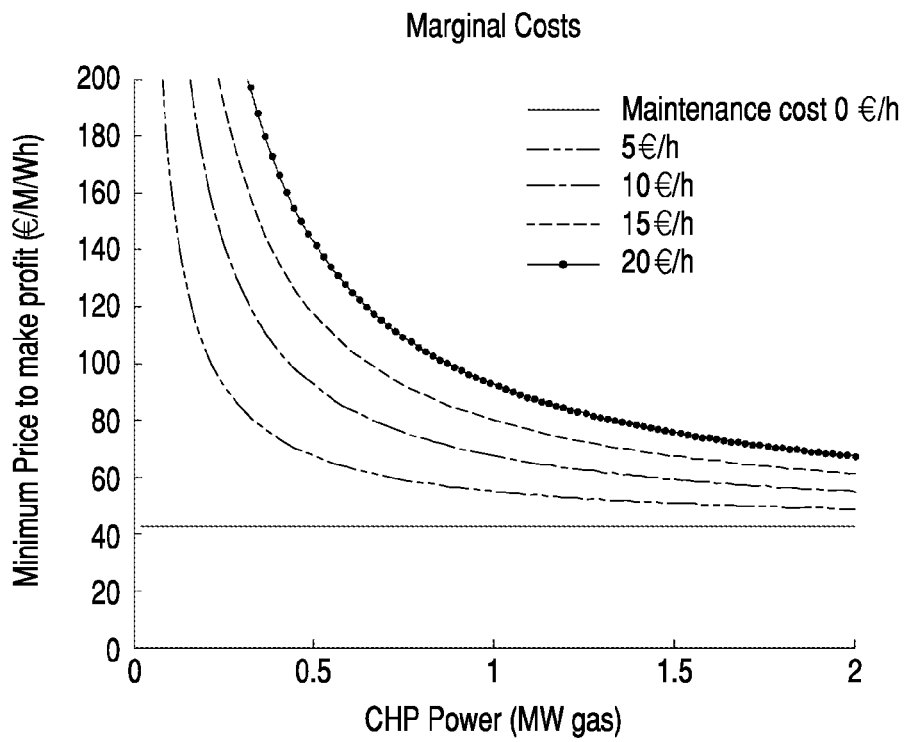
FIG. 20 shows marginal costs as a function of maintenance.

Finally, FIG. 20 shows the marginal costs as function of the maintenance. If no maintenance is taken into account, the marginal cost reduces to the ratio of the gas price to the electric efficiency of the CHP. If maintenance costs are taken into account, the marginal cost $$MC = \frac{M + p_{gas}u}{\eta_{elec}u}$$

with M the maintenance, $p_{gas}$ the gas price, $\eta_{elec}$ the efficiency of the CHP and u the amount of gas (MW) delivered to the CHP.

5.4 Initial State of Charge

Figure 21:
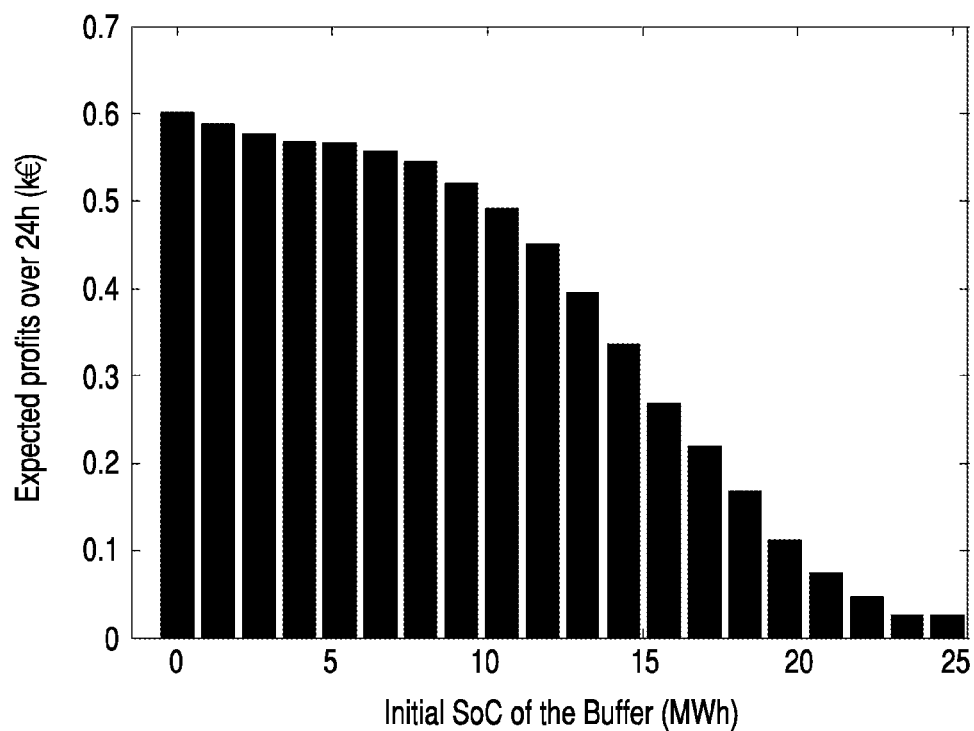
FIG. 21 shows decreasing profits with an increasing SoC.
Figure 22A:
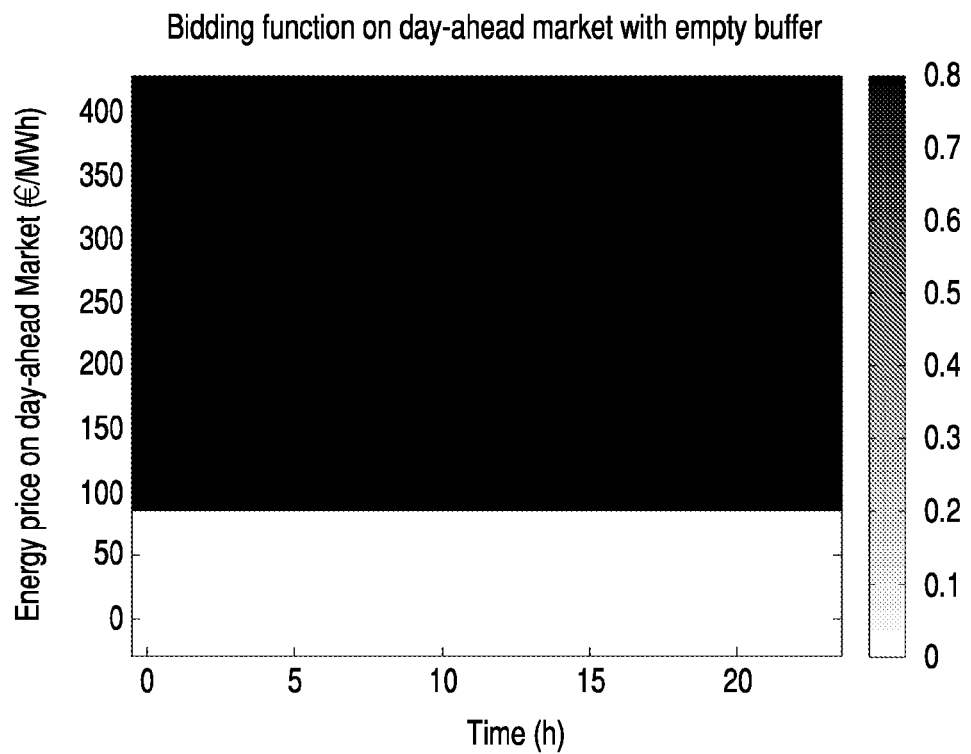
FIG. 22 shows bidding strategies for an empty and full buffer.
Figure 22B:
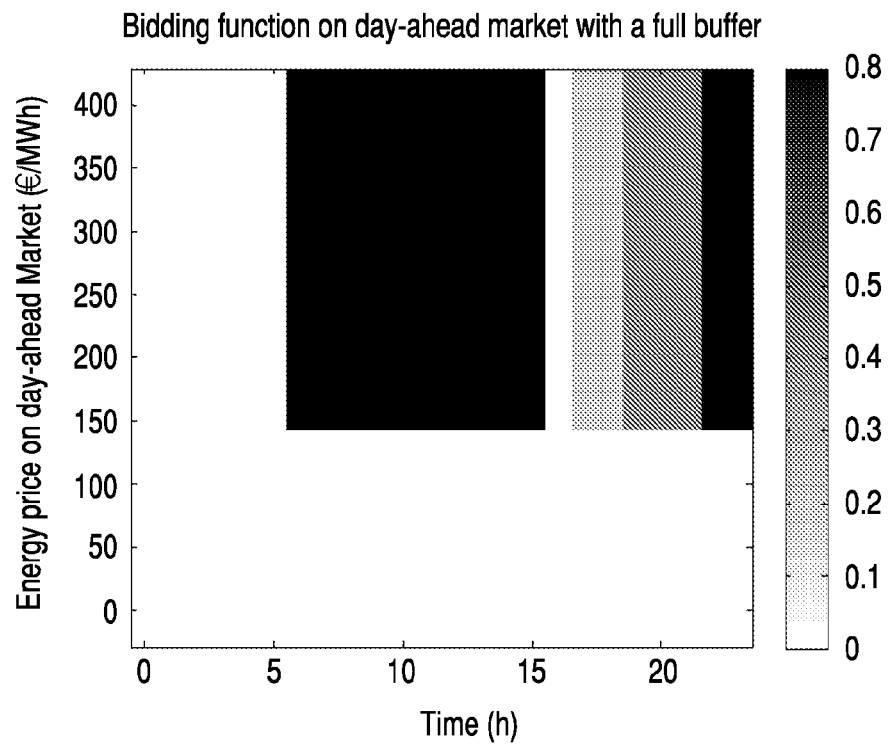

How much power can be sold on the day-ahead market is largely determined by the initial state of charge of the buffer capacity. If the buffer is completely filled, it becomes much harder to guess when to bid on the day-ahead market. This situation is different for an empty buffer. Here the controller is free to bid at every time slot. If some bids appear to be unsuccessful, the conventional installation can still provide the necessary heat. This difference is illustrated in FIGS. 22 (a) and (b): if the buffer is empty, the controller is active all day round and bids starting its marginal cost. If the buffer is full, only around noon the controller is bidding its full power. This is logical, since prices are highest in this period. During the evening it is still bidding, but no longer at its full power. FIG. 21 shows the decreasing profits with an increasing SoC. Profits can vanish if the buffer becomes to full.

5.5 Influence of the Penalty

Figure 23:
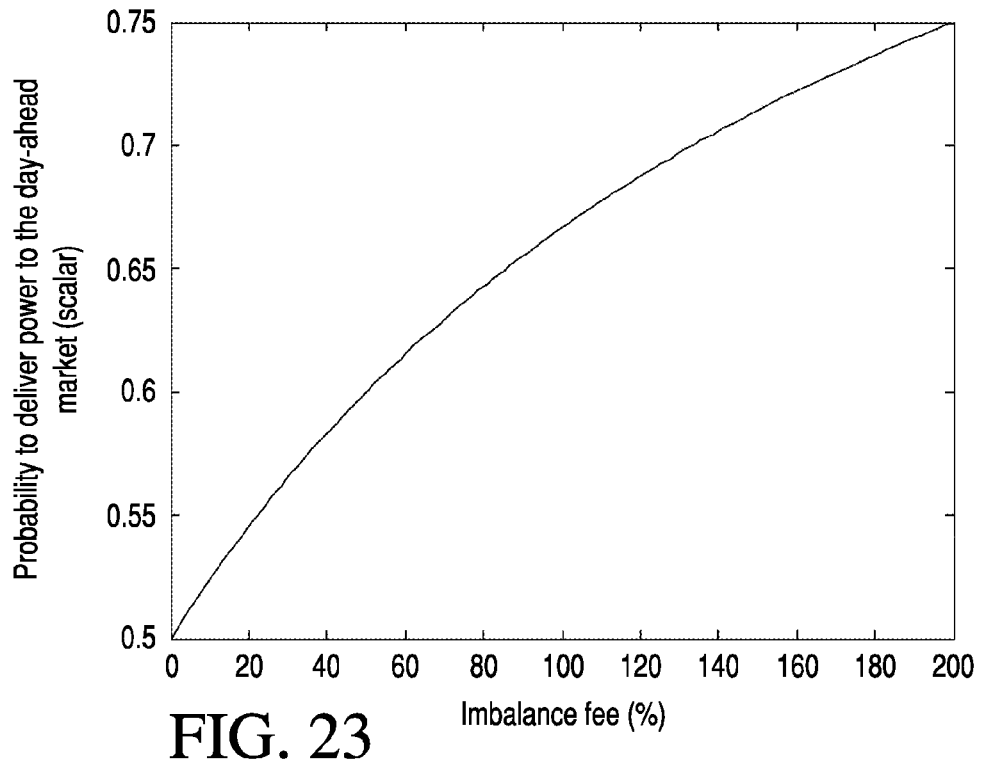
FIG. 23 shows risk a trader can take without expecting loss of money.
Figure 24:
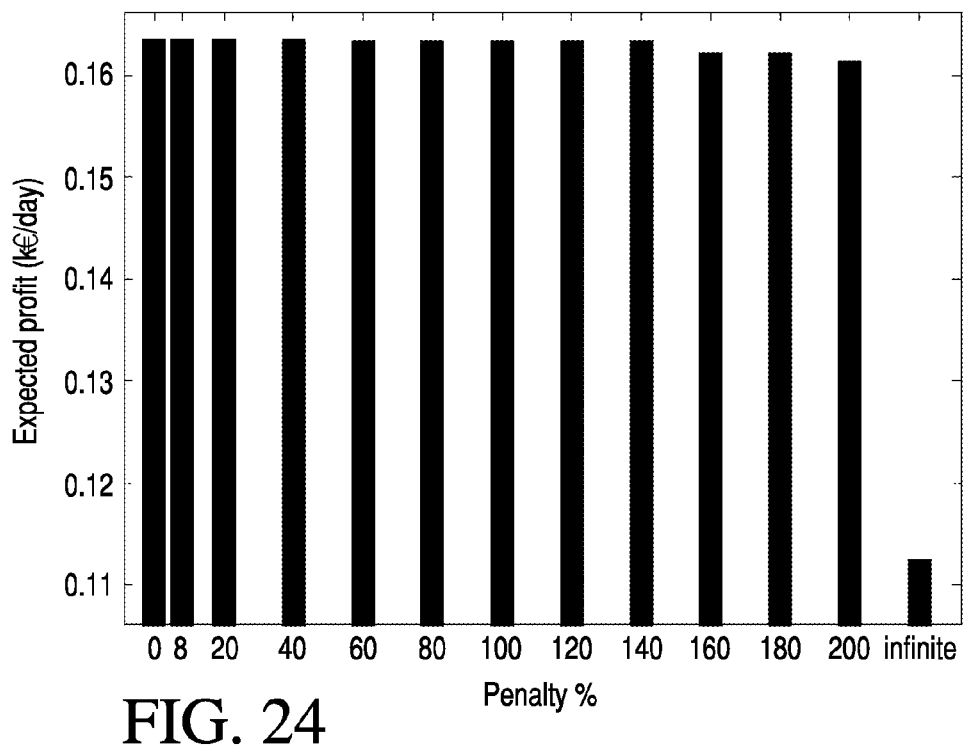
FIG. 24 shows expected profits over a day.

If power is sold on a day-ahead market and cannot be delivered, a penalty has to be paid. Currently, this penalty consists of 100% of the allocation price plus an 8% imbalance charge. This 8% imbalance charge will have some influence on the bidding strategy of the controller. If this charge would be larger, this will result in more cautious bids and vice versa. Since the controller is speculating on the day-ahead market, there is always a probability that the power sold cannot be delivered. If this probability decreases, the expected profit will become negative at a certain moment. FIG. 23 shows the risk that a trader can take without expecting to lose money. If the imbalance fee is 0%, the trader may not be able to deliver power during 50% of the time. Even if this imbalance fee increases to 200%, the trader has to deliver 75% of the time to start making profit. FIG. 24 shows this probability at which the expected profit becomes zero. If the probability that no power can be delivered, e.g. because the buffer is completely filled, is larger than this value, the controller may expect that the penalty is larger than the expected profits and it is wiser not to sell energy. In the current situation, with a penalty of 8%, the "breakevens"-probability is only 52%. So if it is slightly more likely that the buffer is not completely filled at a certain time in the future than that it is, it is better to make the bid. Even if the penalty increases up to 200%, the "breakevens"-probability is 75%.

Of course, the algorithm takes these probabilities implicitly into account and can guide the system in such a way that penalties are avoided without losing too much profit.

If the calculated probability is larger than this value, one may expected to make profit, otherwise losses may be expected. In FIG. 24 the expected profits over a day are shown. Up to penalties of 100%, the profit is hardly influenced, i.e. discretization errors are larger than possible losses. If the penalty increases to 200%, the expected profit decreases from 163 to 161 €/day, which is a very small decrease in profit. Even if the penalty would increase to infinite—meaning that only power will be sold if the controller is sure that can be delivered—the expected profit is still about 112 €/day, which is still quite high.

5.6 Long Term Simulation

As an illustration, the algorithm is evaluated and compared with an alternative strategy. For this specific kind of device, no reference strategy is found in literature. For that reason, we developed a very straightforward approach: the heat consumed today is used to estimate the amount of heat/power the CHP can produce tomorrow. Deviations may occur on this estimation and these are corrected so that the expected state-of-charge is 50% at the end of every day.

To evaluate both algorithms, we simulated one day a week during one year. First the bidding strategies are calculated; next, the realizations of the stochastic variables are selected and daily profits are calculated; and finally the initial PDF for the next day is calculated with the information at hand at 6 am.

Figure 25:
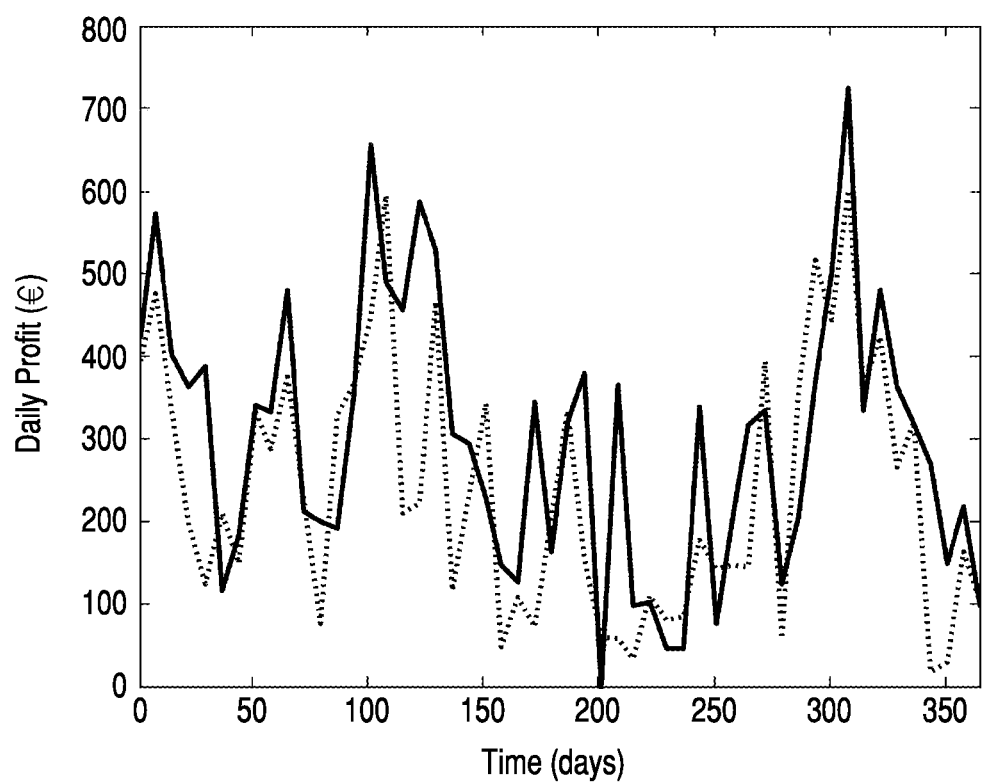
FIG. 25 shows daily profits over one year for the simple approach and the bidding strategy.

Integrated over one year, the simple approach made a profit of 87 k€, while the bidding strategy lead to a profit of 110 k€, which is 25.1% better. Note that this difference might be smaller in reality, due to the correlation between both markets. If the price day-ahead market is low in this simulation, it may be high on the CIM, while in reality, it will probably be low as well. FIG. 25 shows the evolution of both profit-series. In 19 of the 52 simulations, the simple approach did better, but the difference between both strategies was quite small. The mean difference is 60 k€/day if the simple approach did better, while it increased to 129 k€/day is, if the proposed strategy did better.

6 Conclusions

In this paper a trading strategy for industrial CHP installations with buffer capacity is proposed. Special attention is given to the case where the power can be sold on multiple markets with different trading rules. The trading algorithm is based on a dynamical programming scheme, which is adapted to handle open loop problems as well. This is done by the introduction of a Chapman-Kolomogrov equation to calculate the probability density functions in the state space.

If bids are made on multiple markets, the profits increase from 125 €/day on a single day-ahead market to 163 €/day on two markets. Taking the maintenance costs into account mainly results in a more prudent controller, which acts more binary: the CHP is switched off or works at full power. The latter happens only during those hours when the prices are highest. If maintenance costs are unjustified not taken into account the expected profits will hardly change; about 15% of the profit is lost if too large maintenance costs are taken into account. Finally, the influence of the imbalance penalty is examined. This penalty has to be paid if sold power cannot be delivered. These simulations showed that the expected profit is hardly influenced by this penalty fee. Even if the imbalance fee is increased from the current 8% to 200%, the expected profits hardly decrease.

| Symbol List | | |
|---|---|---|
| Symbol | Explanation | Dimension |
| δ(·) | Dirac distribution | — |
| E[·] | Expectation value | — |
| ƒ(·) | Probability density function | Scalar |
| .* | Optimal value | — |
| k | Time counter | Scalar |
| M | Maintenance cost | Euro/hour |

-continued

Symbol List

| Symbol | Explanation | Dimension |
| --- | --- | --- |
| $M_1$ | Maximum of the gas supply to the system | kW |
| $M_2$ | Maximum of the gas supply to the CHP | kW |
| N | Length of time counter | Scalar |
| $P_{acllocation}$ | Allocated price at the day-ahead market | euro |
| $p_{gas}$ | Gas price | Euro/kW |
| $P_k$ | Profit | euro |
| $P_k^{stage}$ | Stage profit | euro |
| $P_k^+$ | Profit-to-go | euro |
| $p_k$ | Price at the day-ahead market | Euro/kW |
| $q_k$ | Amount of gas used to produce heat at the conventional installation | kW |
| $r_k$ | Price at the continuous intraday market | Euro/kW |
| $u_k$ | Amount of gas used to produce power sold at the day-ahead market | kW |
| $v_k$ | Amount of gas used to produce power sold at the continuous intraday market | kW |
| $x_k$ | State-of-charge of the heat buffer | kWh |
| $x_M$ | Maximum state-of-charge of the heat buffer | kWh |
| $\eta_{CI}$ | Thermal efficiency of the conventional installation | Scalar |
| $\eta_{th}$ | Thermal efficiency of the CHP | Scalar |
| $\eta_{el}$ | Electrical efficiency of the CHP | Scalar |

4.2 References

1. Lund H, Andersen AN. Optimal designs of small CHP plants in a market with fluctuating electricity prices. *Energy Conversion and Management* 2005; 46(6): 893-904.
2. Triki C, Beraldi P. Gross G. Optimal capacity allocation in multi-auction electricity markets under uncertainty. *Computers & Operational Research* 2005; 32(2): 201-217.
3. Swider D J. Simultaneous bidding in day-ahead auctions for spot energy and power systems reserve. *International journal of Electrical Power & Energy Systems* 2007: 29:470-479.
4. Ugcdo A, Lobato E, Franco A, Rouco L, Fernandez-Caro J, Chofre J. Strategic bidding in sequential electricity markets. IEEE Proceedings—*Generation, Transmission and Distribution* 2006; 153(4): 431-442.
5. Plazas M A, Conejo A J, Prieto F J. Multimarket optimal bidding for a power producer. *IEEE Transactions on Power Systems* 2005; 20(4): 2041-2050.
6. Philpott A B, Pettersen E. Optimizing demand-side bids in day-ahead electricity markets. *IEEE Transactions on Power Systems* 2006; 21(2): 488-498.
7. Conejo A J, Nogales F J, Arroyo J M. Price-taker bidding strategy under price uncertainty. *IEEE Transactions on Power Systems* 2002: 17(4): 1081-1088.
8. Rodriguez C P, Anders G J . Bidding strategy design for different types of electric power market participants. *IEEE Transactions on Power Systems* 2004; 19(2): 964-971.
9. Fleten S E, Kristoffersen T K. Stochastic programming for optimizing bidding strategies of a Nordic hydropower producer. *European Journal of Operational Research* 2007; 181(2): 916-928.
10. Swider D J, Weber C. Bidding under price uncertainty in multi-unit pay-as-bid procurement auctions for power systems reserve. *European Journal of Operational Research* 2007; 181(3): 1297-1308.
11. Rahimiyan M, Mashhadi H R. Supplier's optimal bidding strategy in electricity pay-as-bid auction: Comparison of the Q-learning and a model-based approach. *Electrical Power Systems Research* 2008; 78(1): 165-175.
12. Sadeh J, Mashhadi H R, Latifi M A. A risk-based approach for bidding strategy in an electricity pay-as-bid auction. *European Transactions on Electrical Power* 2009; 19(1): 39-55.
13. Lamond B F, Boukhtouta A. Neural approximation for the optimal control of a hydroplant with random inflows and concave revenues. *Journal of Energy Engineering-ASCE* 2005; 131(7): 72-95.
14. Bertsekas D. *Dynamic Programming and Optimal Control*, Vols. I and II; $3^{rd}$ edn, Athena Scientific, 1995.
15. Edwin T J. *Probability Theory: The Logic of Science*. Cambridge University Press, 2003.
16. Couchman P, Kouvaritakis B, Cannon M. Gaming strategy for electric power with random demand. *IEEE Transactions on Power Systems* 2005; 20(3): 1283-1292.
17. Li T, Shahidehpour M. Strategic bidding of transmission-constrained GENCOs with incomplete information. *IEEE Transactions on Power Systems* 2005; 20(1): 437-447.
18. Angarita J M, Usaola J G. Combining hydro-generation and wind energy Biddings and operation on electricity spot markets. *Electric Power Systems Research* 2007; 77(5-6): 393-400.
19. Soleymani S, Ranjbar A M, Shirani, A R. Strategic bidding of generating units in competitive electricity market with considering their reliability. *International journal of electrical power & energy systems* 2008; 30(3): 193-201.

The invention claimed is:

1. A fuel control system and a local energy supplying and energy consuming system, wherein the local energy supplying and energy system comprises:
a first controllable electrical unit arranged to output electrical power and to generate a first heat flux within a series of time periods and a second controllable electrical unit arranged to receive electrical power and to absorb a second heat flux within the series of time periods, both first and second controllable electrical units being connected to an electrical network, and wherein the electrical power received or outputted within any time period, is at least partially a stochastic variable, further wherein said stochastic variable is a variable whose value results from determining the magnitude of a quantity within a first probability distribution function, and means for controlling a demand electrical power by a hybrid open loop/closed loop regulatory mechanism, there being some electrical energy received or output within any time period,
a controllable fuel powered heating unit for outputting a third heat flux within the series of time periods,
a controllable heat buffer arranged to store any or all of the first to third heat fluxes and outputting a fourth heat flux within the series of time periods, the fuel powered heating unit being coupled to the heat buffer, and a heat flux user thermally coupled to the heat buffer, the demand for heat power by the heat flux user within the series of time periods being a stochastic variable, wherein said stochastic variable is a variable whose value results from determining the magnitude of a quantity within a second probability distribution, and a controller being coupled to the first and second electrical unit, the fuel powered heating unit and the heat flux user to exchange control variables therewith and to control fuel supply to the fuel powered heating unit so that
a) the demand for heat power by the heat flux user is satisfied in any of the time periods and
b) the heat buffer is not overfull or empty in any of the time periods and the fuel control system being adapted to determine the quantity of fuel needed by the fuel powered heating unit.

2. The fuel control system and local energy supplying and energy consuming system of claim 1, wherein the first controllable electrical unit is a CHP-unit, and each time period being divided into successive sub-periods, the systems further comprising:
means for determining for each sub-period on a historical basis a statistical price of the electrical energy in at least one market served by the electrical network;
means for determining for each sub-period on a historical basis a statistical value of the demand of heat flux by the user;
means for deriving, for each sub-period, from said statistical price and said statistical value the quantity of fuel needed by the CHP-unit so that the working of the local energy supplying and energy consuming system is optimized.

3. The fuel control system and local energy supplying and energy consuming system of claim 2, further comprising:
means for deriving, for each sub-period, from said statistical price and said statistical value the quantity of fuel needed by the fuel powered heating unit or a cooling unit so that the working of the local energy supplying and energy consuming system is optimized.

4. The fuel control system and local energy supplying and energy consuming system of claim 2, wherein the determining the statistical price is done by on the basis of a temporal probability density function.

5. The fuel control system and local energy supplying and energy consuming system of claim 2, wherein the determining the statistical value of the heat demand is done by on the basis of a temporal probability density function.

6. The fuel control system and local energy supplying and energy consuming system of claim 2, wherein the electrical network is serving at least two different markets in which electrical energy is handled at different prices, and wherein the means for determining the statistical price, determines the price on each of these markets.

7. The fuel control system and local energy supplying and energy consuming system of claim 6, wherein the deriving of the quantity of fuel needed by the CHP-unit and the quantity of fuel needed by the fuel powered heating unit is performed at two levels: a first level deriving the fuel needed by the CHP-unit for covering the electricity production, demanded by the one of the markets and a second level deriving the fuel needed by the CHP-unit for covering the electricity production, demanded by the other of the two markets and deriving the fuel needed by the fuel powered heating unit.

* * * * *